(12) United States Patent
Morin et al.

(10) Patent No.: US 12,080,954 B2
(45) Date of Patent: *Sep. 3, 2024

(54) SYSTEM AND METHOD FOR A MULTI-CHANNEL ANTENNA SYSTEM

(71) Applicant: Fortem Technologies, Inc.

(72) Inventors: Matthew Robertson Morin, Provo, UT (US); Brandon Robert Hicks, Saratoga Springs, UT (US); James David Mackie, Provo, UT (US); Bryan Alan Davis, Salt Lake City, UT (US)

(73) Assignee: Fortem Technologies, Inc., Pleasant Grove, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/064,505

(22) Filed: Dec. 12, 2022

(65) Prior Publication Data
US 2023/0137080 A1 May 4, 2023

Related U.S. Application Data

(63) Continuation of application No. 16/520,093, filed on Jul. 23, 2019, now Pat. No. 11,527,825.

(51) Int. Cl.
*H01Q 3/38* (2006.01)
*G01S 7/03* (2006.01)
*H01Q 1/24* (2006.01)
*H01Q 21/22* (2006.01)

(52) U.S. Cl.
CPC .............. *H01Q 3/38* (2013.01); *G01S 7/03* (2013.01); *H01Q 1/247* (2013.01); *H01Q 21/22* (2013.01)

(58) Field of Classification Search
None
See application file for complete search history.

(56) References Cited

U.S. PATENT DOCUMENTS

| | | |
|---|---|---|
| 8,947,294 B1 | 2/2015 | Wasiewicz |
| 2002/0171584 A1 | 11/2002 | Walker et al. |
| 2011/0291891 A1 | 12/2011 | Nsenga et al. |
| 2013/0214961 A1 | 8/2013 | Lee et al. |
| 2017/0170556 A1 | 6/2017 | Carey et al. |
| 2018/0011180 A1 | 1/2018 | Warnick et al. |
| 2018/0083813 A1 | 3/2018 | Novak et al. |

*Primary Examiner* — Whitney Moore

(57) ABSTRACT

Systems, methods, and computer-readable media are described for combining digital and analog beamsteering in a channelized antenna array. In some examples, a method can include receiving one or more signals at each of a plurality of groups of antenna elements, each group of antenna elements defining a respective channel from a plurality of channels, and steering, by each respective channel and using analog steering, the one or more signals in a respective direction to yield a steered analog signal pattern. The method can further include converting the steered analog signal pattern associated with each respective channel into a respective digital signal and, based on the respective digital signal, generating, using digital steering, digital signal patterns steered within the steered analog signal pattern associated with the respective digital signal.

18 Claims, 14 Drawing Sheets

SYSTEM AND METHOD FOR A MULTI-CHANNEL ANTENNA SYSTEM

PRIORITY INFORMATION

The present application is a continuation of U.S. patent application Ser. No. 16/520,093, filed Jul. 23, 2019, the content of which is incorporated herein by reference in its entirety.

This application is related to U.S. Non-Provisional patent application Ser. No. 16/129,136, filed on Sep. 12, 2018, entitled "COMPACT RADAR SYSTEM", which claims priority to U.S. Provisional Patent Application No. 62/557,726, filed on Sep. 12, 2017, entitled "COMPACT RADAR SYSTEM", the contents of which are hereby expressly incorporated by reference in their entirety.

TECHNICAL FIELD

The present technology pertains to radar technologies, and more specifically to a multi-channel antenna design.

BACKGROUND

Radio signals produced by radar technologies can vary in terms of clarity and completeness, which can affect the performance quality and accuracy of the radar system. Many times, signals sent or received by a radar system can create or experience signal noise, clutter, jamming, etc., further degrading the performance of the radar system. Moreover, the detection range and field of view (FOV) of radar systems are often limited, resulting in reduced awareness of the environment and surrounding objects. In some cases, beamforming and beamsteering techniques can be implemented by a radar system to improve the performance of the radar system. Beamforming and beamsteering allow a radar system to tailor the shape and direction of antenna beams in order to target certain objects, avoid unwanted targets, or limit signal noise and clutter.

Beamforming and beamsteering can be accomplished using digital or analog techniques, both of which have different tradeoffs. For example, digital beamsteering can provide a larger instantaneous field of view for a given aperture than analog beamsteering, as it allows data to be collected and subsequently used for steering. However, digital beamsteering can be expensive—particularly when a larger aperture is needed—as it generally requires more hardware for a large amount of channels, and can impose a heavy computational burden which often requires more powerful computing devices. On the other hand, analog beamsteering can implement a large amount of channels formed using analog arrays and thereby provide cost, power, and complexity savings. Unfortunately, the benefits of analog beamsteering often come at the expense of performance and quality.

BRIEF DESCRIPTION OF THE DRAWINGS

In order to describe the manner in which the above-recited and other advantages and features can be obtained, a more particular description will be rendered by reference to specific implementations thereof which are illustrated in the appended drawings. Understanding that these drawings depict only example implementations of the disclosure and are not therefore to be considered to be limiting of its scope, the principles herein will be described and explained with additional specificity and detail through the use of the accompanying drawings in which.

DETAILED DESCRIPTION

Figure 1:
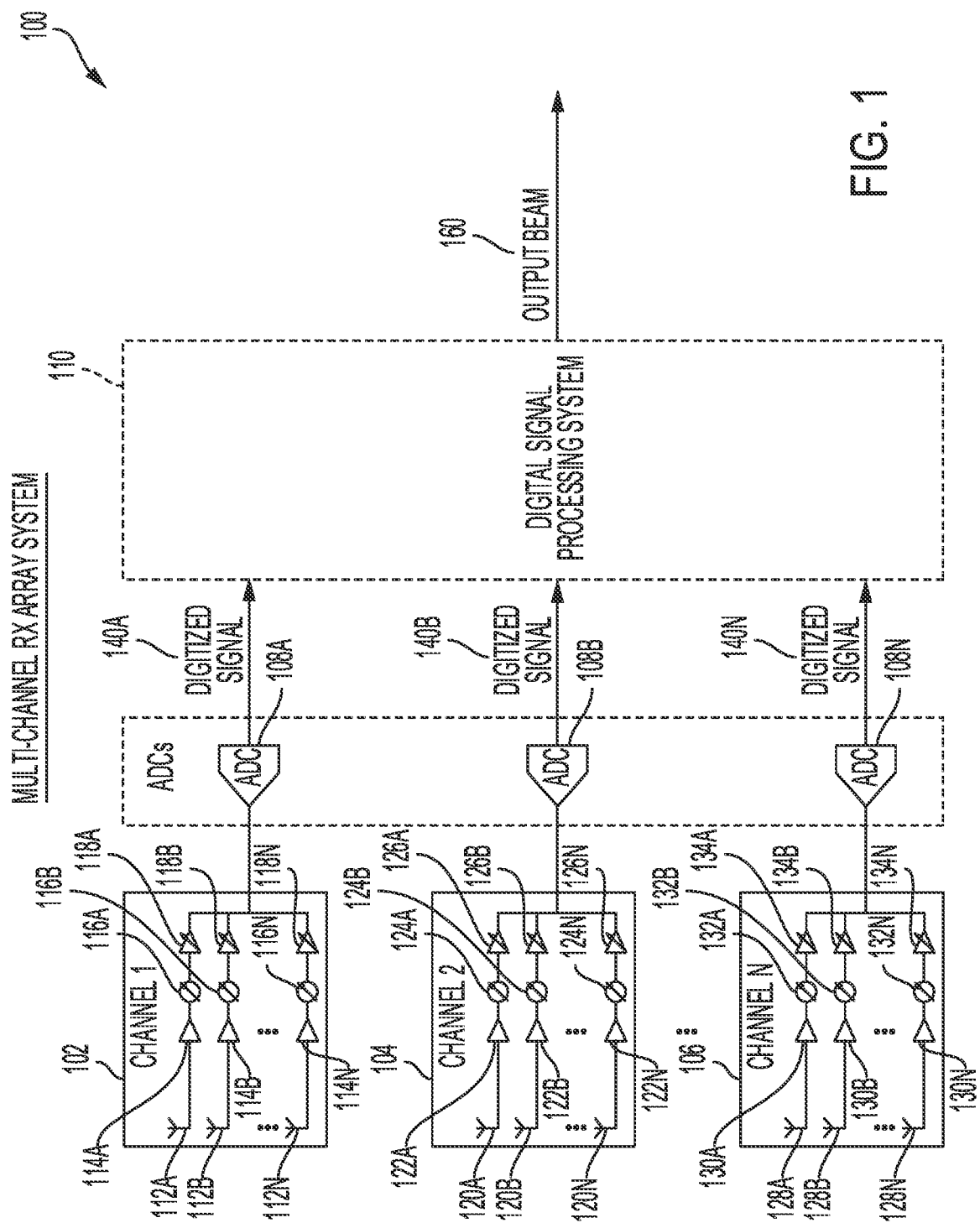
FIG. 1 illustrates an example architecture for a multi-channel RX array system 100, in accordance with some examples.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description.

References to one or an embodiment in the present disclosure can refer to the same embodiment or any disclosed embodiment. For example, reference to "one embodiment", "an embodiment" or "some embodiments" means that any features, concepts, structures, and/or characteristics described in connection with such embodiment(s) are included in at least such embodiment(s) of the disclosure, but are not limited to such embodiment(s) and can indeed be included in any other embodiment(s) of the disclosure. The appearances of the phrases "in one embodiment", "in an embodiment" or "in some embodiments" in various places in the disclosure are not necessarily all referring to the same embodiment(s), nor are separate or alternative embodiments mutually exclusive of other embodiments.

The terms used in this specification generally have their ordinary meanings in the art, within the context of the disclosure, and in the specific context where each term is used. Unless otherwise defined, technical and scientific terms used herein have the meaning as commonly understood by one of ordinary skill in the art to which this disclosure pertains. In the case of conflict, the present document, including definitions and description will control.

Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms.

The use of examples anywhere in this specification including examples of any terms discussed herein is illustrative only, and is not intended to further limit the scope and meaning of the disclosure or of any example term. Note that titles or subtitles may be used in the examples for convenience of a reader, which in no way should limit the scope of the disclosure.

Without intent to limit the scope of the disclosure, examples of instruments, apparatus, methods and their related results according to embodiments of the present disclosure are given below. However, the disclosure is not limited to the examples or embodiments described in this specification. Additional features and advantages of the disclosure will be set forth in the description which follows, and in part will be obvious from the description, or can be learned by practice of the principles disclosed herein. The features and advantages of the disclosure can be realized and obtained by means of the instruments, elements and techniques particularly pointed out in the appended claims. These and other features of the disclosure will become more fully apparent from the following description and appended claims, and/or can be learned by the practice of the principles set forth herein.

Overview

Disclosed herein are systems, methods, and computer-readable media for combining digital and analog beamsteering in a channelized antenna array. The multi-channel antenna design and steering techniques described herein can provide significant savings in the size, weight, power and cost (SWaP-C) of antennas, as well as a larger instantaneous field of view (FOV), high update rates, and better antenna coverage and cross-section (RCS) performance. For example, the combination of digital and analog beamforming and beamsteering techniques implemented by the multi-channel antenna design herein can increase signal efficiency and accuracy while suppressing noise, clutter, and jamming. The multi-channel antenna design can isolate or null certain signal reflections to avoid noise, error, and interference.

In some aspects, a method is provided for implementing a multi-channel antenna array configured to perform a combination of digital and analog beamsteering. An example method can include receiving one or more signals at each of a plurality of groups of antenna elements, each group of antenna elements defining a respective channel from a plurality of channels, and steering, using analog steering, a respective signal pattern generated by each respective channel based on the one or more signals, the respective signal pattern being steered in a respective direction to yield a steered analog signal pattern.

The example method can further include converting the steered analog signal pattern associated with each respective channel into a respective digital signal and, based on the respective digital signal, generating, using digital steering, one or more steered digital signal patterns, the one or more steered digital signal patterns being steered within the steered analog signal pattern associated with the respective digital signal.

In some aspects, a system is provided for implementing a multi-channel antenna array configured to perform a combination of digital and analog beamsteering. An example system can include a plurality of groups of antenna elements configured to receive one or more signals at each of the plurality of groups of antenna elements, where each group of antenna elements defines a respective channel from a plurality of channels and each respective channel is configured to generate a respective signal pattern based on the one or more signals and steer the respective signal pattern in a respective direction using analog steering to yield a steered analog signal pattern.

The example system can further include one or more processing elements configured to convert the steered analog signal pattern associated with each respective channel into a respective digital signal and, based on the respective digital signal, generate, using digital steering, one or more steered digital signal patterns. The one or more steered digital signal patterns can be steered within the steered analog signal pattern associated with the respective digital signal.

In some cases, generating the one or more steered digital signal patterns can include based on the respective digital signal associated with at least one of the plurality of channels, steering one or more nulls in one or more directions associated with a source of interference and/or an unwanted target, and steering a plurality of digital signals associated with a set of channels from the plurality of channels. In some examples, the one or more directions can be at least partly within the steered analog signal pattern, and the plurality of digital signals can be steered in one or more different directions associated with one or more targets.

In some implementations, at least one of the plurality of digital signals and/or the one or more nulls can be steered based on data collected via at least one of the plurality of channels. In some cases, at least a portion of the data can be collected from at least one of the one or more signals received at each of the plurality of groups of antenna elements. Moreover, each respective channel can include a group of antenna elements, phase shifters and/or amplifier elements, and each antenna element from the group of antenna elements can be associated with a phase shifter and/or at least one amplifier element. The at least one amplifier element can include, for example, a low-noise amplifier and/or a variable-gain amplifier.

In some aspects, receiving the one or more signals can include receiving a signal at each antenna element associated with each respective channel, and steering the respective signal pattern can include applying, at each respective channel and to each signal received at each antenna element, the low-noise amplifier associated with the antenna element to yield a first respective modified signal; applying, at each respective channel and to the first respective modified signal, the phase shifter associated with the antenna element to yield a second respective modified signal; applying, to the second respective modified signal, the variable-gain amplifier associated with the antenna element to yield a third respective modified signal; and performing a summation of the third respective modified signal associated with each antenna element to yield an output representing the steered analog signal pattern.

In some aspects, generating one or more steered digital signal patterns can include generating a plurality of steered digital beams, with each of the plurality of steered digital beams being associated with one or more of the plurality of channels and each of the plurality of steered digital beams being steered in a different direction within the steered analog signal pattern.

In some cases, the plurality of channel patterns can have a tiled arrangement such that all of the plurality of channel patterns fit together within the steered analog signal pattern without overlapping. Moreover, in some implementations, at least some of the plurality of channel patterns can have a circular shape, a partly circular shape, a same shape, a tillable shape, one or more different shapes, a diamond shape, an elliptical shape and/or a tiled arrangement. Also, in some implementations, the plurality of channels can include at least three channels.

In some aspects, the plurality of groups of antenna elements and the plurality of channels can be part of a radar system. Moreover, in some cases, each group of antenna elements (and each respective channel) can include at least two different antenna elements, for example.

In some aspects, steering the one or more signals in the respective direction to yield the steered analog signal pattern can include steering one or more nulls in one or more directions associated with at least one of a source of interference and an unwanted target, the one or more directions being at least partly within the steered analog signal pattern; and steering a plurality of analog signals associated with a set of channels from the plurality of channels, the plurality of analog signals being steered in one or more different directions associated with one or more targets.

Moreover, in some examples, steering at least one of the plurality of analog signals and the one or more nulls can be based on data collected via at least one of the plurality of channels, and at least a portion of the data can be collected from at least one of the one or more signals received at each of the plurality of groups of antenna elements.

Description of Example Embodiments

Figure 7:
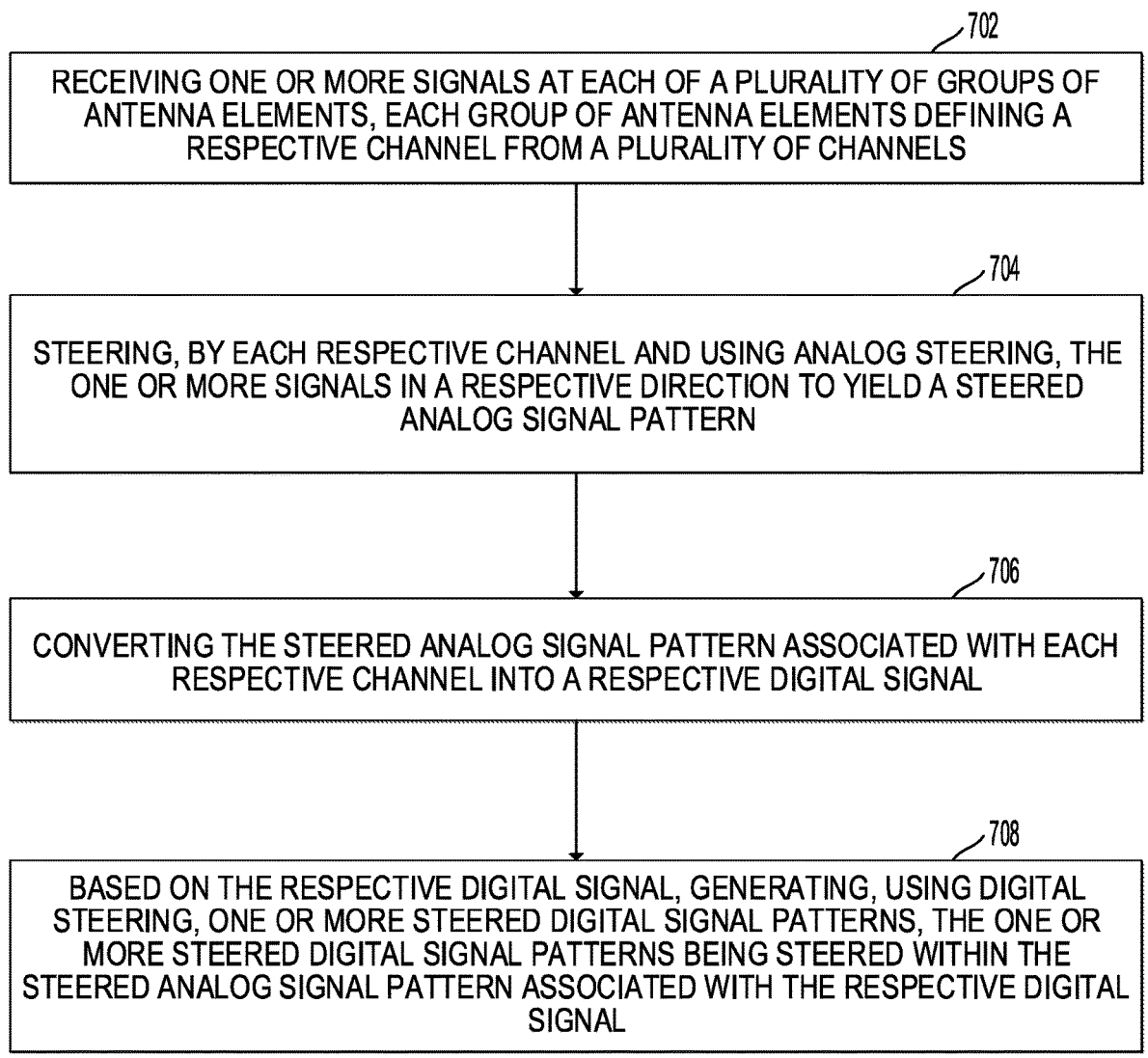
FIG. 7 illustrates an example method for combining digital and analog beamsteering in a channelized antenna array, in accordance with some examples.
Figure 8:
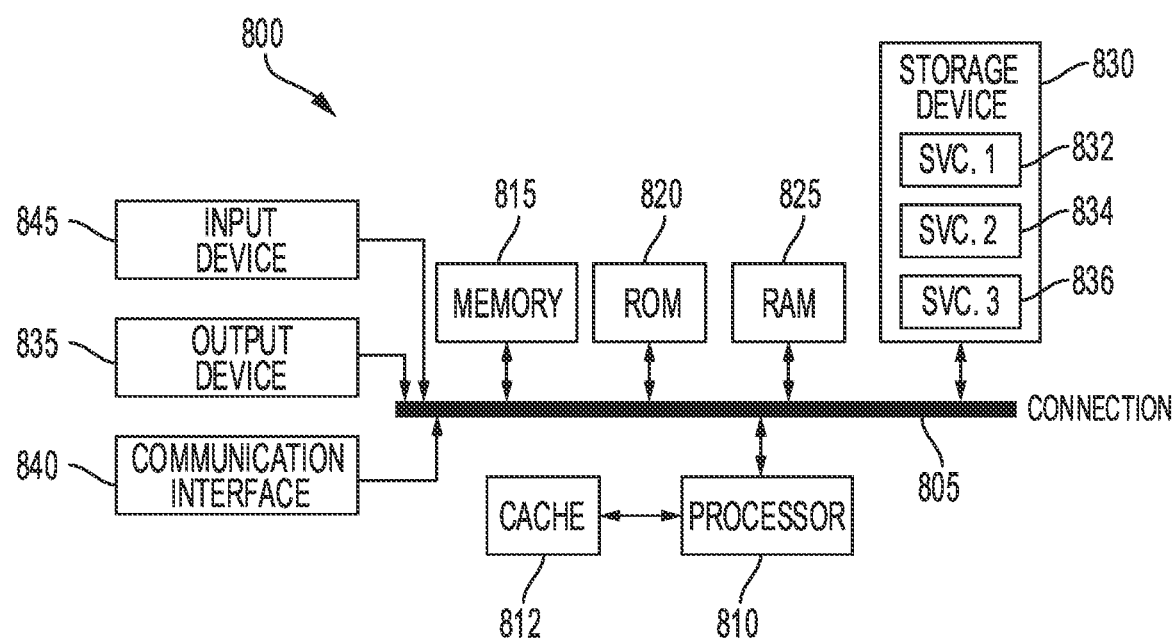
FIG. 8 illustrates a computer system architecture for an example computing device which can be used to implement computing operations, in accordance with some examples.

The present technology will be described in the following disclosure as follows. The disclosure begins with a discussion of example systems, configurations and techniques for implementing a multi-channel antenna array configured to perform a combination of digital and analog beamsteering, as shown in FIGS. 1 through 6. A discussion of an example method for performing a combination of digital and analog beamsteering using a multi-channel antenna array, as shown in FIG. 7, will then follow. The discussion concludes with a description of an example computing device architecture, as illustrated in FIG. 8, including example hardware components that can be implemented by radar systems and computing devices.

The disclosure now turns to FIG. 1, which illustrates an example architecture for a multi-channel RX array system 100. In some examples, the multi-channel RX array system 100 can be a receiver (RX) antenna system. Moreover, the multi-channel RX array system 100 can include multiple channels 102, 104, 106. Each of the channels 102, 104, 106 can include a group of antenna elements (e.g., 112A-N, 120A-N, 128A-N), a group of low-noise amplifiers or LNAs (e.g., 114A-N, 122A-N, 130A-N), a group of phase shifters (e.g., 116A-N, 124A-N, 132A-N), and/or a group of variable gain amplifiers or VGAs (e.g., 118A-N, 126A-N, 134A-N).

For example, channel 102 can include antenna elements 112A-N, low-noise amplifiers 114A-N, phase shifters 116A-N, and variable gain amplifiers 118A-N; channel 104 can include antenna elements 120A-N, low-noise amplifiers 122A-N, phase shifters 124A-N, and variable gain amplifiers 126A-N; and channel 106 can include antenna elements 128A-N, low-noise amplifiers 130A-N, phase shifters 132A-N, and variable gain amplifiers 134A-N.

Each of the channel 102, 104, 106 can perform analog beamsteering to steer signals received by the antenna elements (112A-N, 120A-N, 128A-N) associated with that channel. For example, the respective antenna elements (112A-N, 120A-N, 128A-N) in each channel (102, 104, 106) can respectively receive one or more signals, such as radar returns, and use respective LNAs (114A-N, 122A-N, 130A-N), phase shifters (116A-N, 124A-N, 132A-N), and VGAs (118A-N, 126A-N, 134A-N) from the channel associated with the respective antenna elements to perform analog steering and generate an analog beam or signal pattern based on the received signals.

Each antenna element (112A-N, 120A-N, 128A-N) in each channel (102, 104, 106) can be associated with a specific LNA, phase shifter, and VGA, which can implemented to steer (using analog steering) one or more signals received by each antenna element in each channel and generate an analog signal pattern. For example, antenna elements 112A, 112B, and 112N in channel 102 can respectively be associated with LNAs 114A, 114B, and 114N, phase shifters 116A, 116B, 116N, and VGAs 118A, 118B, and 118N. Similarly, antenna elements 120A, 120B, and 120N in channel 104 can respectively be associated with LNAs 122A, 122B, and 122N, phase shifters 124A, 124B, 124N, and VGAs 126A, 126B, and 126N; and antenna elements 128A, 128B, and 128N in channel 106 can respectively be associated with LNAs 130A, 130B, and 130N, phase shifters 132A, 132B, 132N, and VGAs 134A, 134B, and 134N.

The LNAs (114A-N, 122A-N, 130A-N) can amplify the one or more signals received from their associated antenna elements (112A-N, 120A-N, 128A-N). For example, each LNA (114A-N, 122A-N, 130A-N) can receive a signal from an associated antenna element (112A-N, 120A-N, 128A-N) and boost the signal to a particular level to overcome any noise of the following circuits or components (e.g., variable phase shifters 116A-N, 124A-N, 132A-N and VGAs 118A-N, 126A-N, 134A-N).

The phase shifters (116A-N, 124A-N, 132A-N) can receive the boosted analog signals from the LNAs (114A-N, 122A-N, 130A-N) and perform invariable phase shifting or invariable time delays to the boosted analog signals to generate respective analog steering signal patterns. The signal pattern from each channel 102, 104, 106 can be steered in a particular direction. In some cases, the signal pattern for each channel 102, 104, 106 can be steered in a same direction to generate a channel pattern reflected by the steering of each channel in the same direction.

The VGAs (118A-N, 126A-N, 134A-N) can then adjust the gain of the output signals from the phase shifters (116A-N, 124A-N, 132A-N) to compensate for variable losses and/or match the signals to a full-scale input of analog-to-digital converters (ADCs) 108A-N in the multi-channel RX array system 100. The ADCs 108A-N can receive the output analog (steered) signal pattern from the channels 102, 104, 106 and digitize the signals to generate digitized signals 140A-N representing the analog signal or channel pattern produced by the channels 102, 104, 106.

Each channel (102, 104, 106) can be associated with a specific ADC (108A-N) configured to digitize the output analog signal from that channel. For example, channel 102 can be associated with ADC 108A, which can digitize signals from channel 102; channel 104 can be associated with ADC 108B, which can digitize signals from channel 104; and channel 106 can be associated with ADC 108N, which can digitize signals from channel 106.

The digitized signals 140A-N are then processed by a digital signal processing system 110 configured to digitally steer the digitized signals 140A-N and generate an output digital beam 160 steered in any particular direction. In some cases, the output digital beam 160 can be steered within or on top of the channel pattern produced by the channels 102, 104, 106. In some cases, the output digital beam 160 and/or the channel pattern can have a circular or pseudo-circular shape. Moreover, in some cases, the output digital beam 160 can have a same or similar shape as other output beams generated by the multi-channel RX array system 100, which can be tiled within the channel pattern. For example, the output digital beam 160 can have the same or similar shape as other output beams, all of which can be tiled (via beamforming/beamsteering) to fit together within the channel pattern without leaving gaps and/or overlapping.

The digital signal processing system 110 can include, for example, one or more circuits, one or more processing devices, one or more printed circuit boards, one or more controllers, one or more software and/or hardware modules, etc. For example, the digital signal processing system 110 can include a field-programmable gate array (FPGA), a digital signal processor, an application-specific integrated circuit (ASIC), and/or the like. Moreover, the digital signal processing system 110 can implement beamformers configured to digitally steer the digitized signals 140A-N and generate the output digital beam 160.

The digital signal processing system 110 can form and steer the output digital beam 160 by applying a phase shifting value and/or time delay to the digitized signals 140A-N. For example, in some cases, the digital signal processing system 110 can combine and/or apply respective steering and correction coefficients to the digitized signals 140A-N to generate the output digital beam 160.

The output digital beam 160 can correspond to one or more channels (102, 104, 106) and can have a particular digital signal pattern. In some cases, the digital signal processing system 110 can steer the output digital beam 160 in any particular direction to generate a particular digital signal pattern for the channels 102, 104, and/or 106, which can be directed or aimed at one or more targets (or objectives), such as an intended target object(s), an unwanted target object or signal source, an interference source, etc. For example, the digital signal processing system 110 can generate output digital beams (e.g., 160) with different signal patterns for the different channels 102, 104, 106 by steering the output digital beams in different directions.

To illustrate, digital signal processing system 110 can generate a digital beam (160) for channel 102, which can be directed towards an intended target, such as an aircraft or any other object. The digital signal processing system 110 can generate a digital beam (160) for channel 104, which can be directed towards an unwanted target, such as an aircraft or any other object, and digital signal processing system 110 can generate a digital beam (160) for channel 106 using null steering to cancel or null a source of noise, clutter, interference, etc.

In this way, the multi-channel RX array system 100 can perform analog steering to generate a channel or signal pattern(s) for one or more analog signals received by the multi-channel RX array system 100, and digitally steer a digital beam (e.g., 160) produced for one or more channels (102, 104, 106) in a particular direction within the overall channel or signal pattern(s) generated for the one or more analog signals received by the multi-channel RX array system 100. In some cases, the output digital beam(s) associated with the different channels 102, 104, 106 can fit within the overall channel or signal pattern(s) generated for the one or more analog signals. Moreover, the output digital beam 160 can be more narrow than the analog signal pattern, which can allow the multi-channel RX array system 100 to see farther out and in a greater number of directions.

The combination of analog and digital beamsteering can allow the multi-channel RX array system 100 to generate an analog channel pattern with greater coverage, and digitally steer beams (using the different channels 102, 104, 106) within the channel pattern and/or over the solid angle of the channel pattern to achieve a larger/wider instantaneous field of view for detections and/or angle of arrivals, improved directivity, a reduction or nulling of unwanted signals or conditions (e.g., noise, interference, error, clutter, unwanted objects, etc.), a greater maximum range of detection for a longer period of time, etc. Moreover, the use of digital steering can allow the multi-channel RX array system 100 to look in all or a large number of directions for a longer period of time, while the use of analog steering can provide cost, power and complexity savings, while achieving better performance with a smaller number of channels.

The multiple channels 102, 104, 106 allow the multi-channel RX array system 100 to operate in clutter, nulling out clutter that appears in the same range and doppler bins as a target of interest and enabling the multi-channel RX array system 100 to keep the signal for the target of interest clean. In some cases, more nulls may be needed in the azimuth case or dimension, which can have two directions in which clutter can simultaneously appear in the same range and doppler bin, as opposed to the elevation case or dimension, where there is typically only one point where clutter will enter a certain range and doppler bin. Accordingly, in some cases, the multi-channel RX array system 100 may implement more channels in the azimuth dimension than the horizontal dimension.

For example, assume the number n of nulls that can be steered along an axis is equal to c−1, where c represents the number of channels along the axis. This means that at least three channels may be needed in the azimuth case to null out clutter. However, in some cases, increasing the number of channels can result in more effective nulling and clutter cancellation. Accordingly, in some configurations, the multi-channel RX array system 100 may implement more than three channels.

Moreover, the multi-channel design of the multi-channel RX array system 100, where each channel (102, 104, 106) has a plurality of antenna elements, can be tiled so the channel shapes can fit together without leaving gaps and/or overlapping, and while in some cases having the same or similar shape. Further, in some cases, with the weighting of signals, the arrangement of the array may be circular or partly circular. Accordingly, in such cases, the overall Rx pattern can be designed to be circular or partly circular. In some cases, some or all of the channels 102, 104, 106 can have a diamond shape, an elliptical shape, a tiled arrangement, a circular shape, a partly circular shape, a tillable shape, a same shape, one or more different shapes, and/or any other shape.

Figure 2:
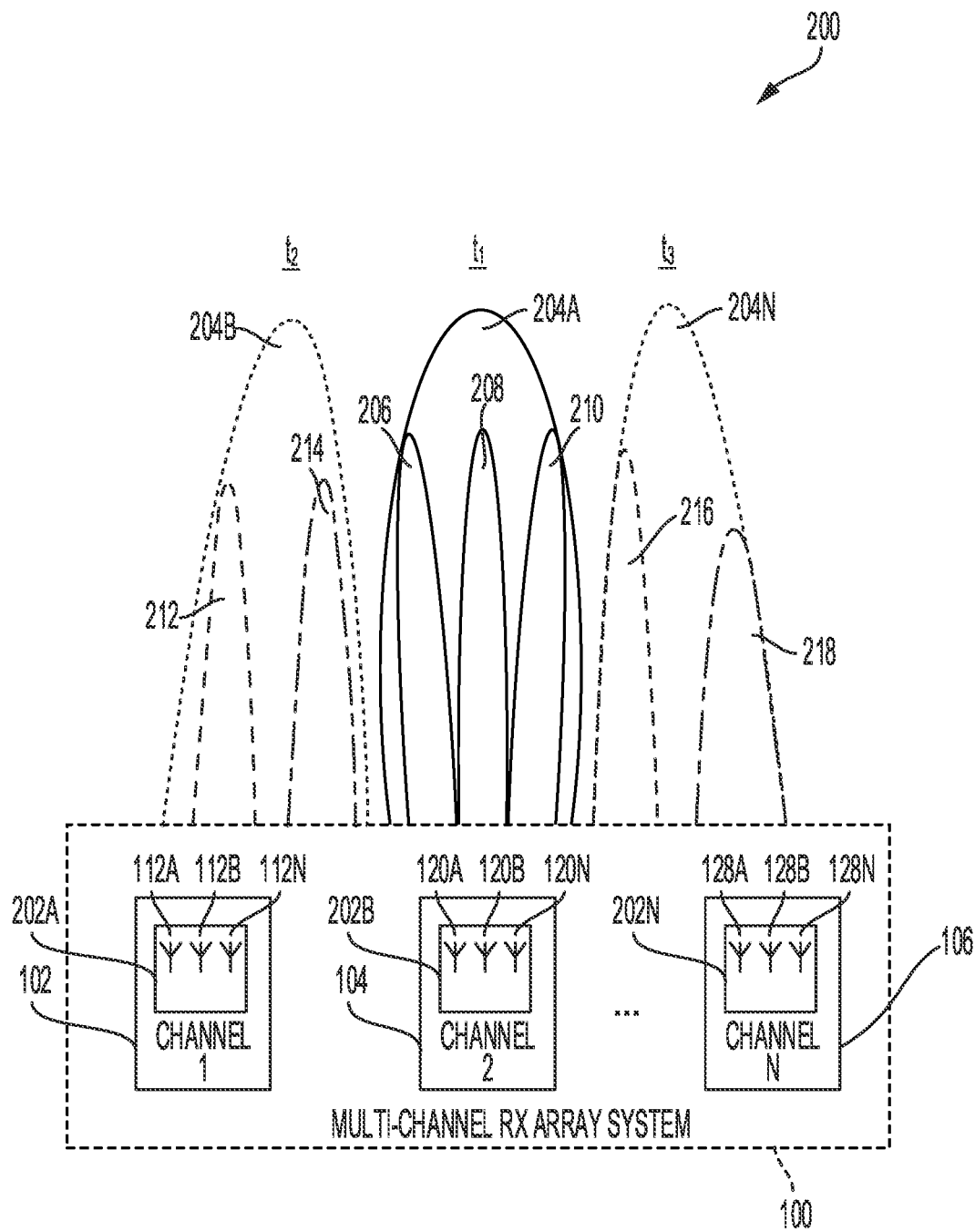
FIG. 2 illustrates an example design of channel patterns and beam shapes, in accordance with some examples.

FIG. 2 illustrates an example design 200 of beam shapes 206, 208, 210, 212, 214, 216, 218. In this example, the beam shapes 206, 208, 210 are generated at time $t_1$ and fit within channel pattern 204A. In some cases, the channel pattern 204A can represent an overall or summed multi-channel pattern generated by the multi-channel RX array system 100. As illustrated, the design 200 allows the different beam shapes 206, 208, 210, 212, 214, 216, 218 to fit within the channel patterns 204A-N without leaving gaps and/or overlapping.

The beam shapes 206, 208, 210 can represent signal patterns or shapes generated using the different channels 102, 104, 106. For example, the beam shape 206 can represent a signal or pattern generated using channel 102, the beam shape 208 can represent a signal or pattern generated using channel 104, and the beam shape 210 can represent a signal or pattern generated using channel 106.

Similarly, the beam shapes 212, 214, 216, 218 can represent signal patterns generated using the different channels 102, 104, 106. For example, the beam shape 212 can represent a signal or pattern generated at time $t_2$ using channel 102, 104, or 106; the beam shape 214 can represent a signal or pattern generated at time $t_2$ using channel 102, 104, or 106; the beam shape 216 can represent a signal or pattern generated at time $t_3$ using channel 102, 104, or 106; and the beam shape 218 can represent a signal or pattern generated at time $t_3$ using channel 102, 104, or 106.

In some cases, the beam shapes 206, 208, 210, 212, 214, 216, 218 and/or the channel patterns 204A-N can have a same or similar shape. For example, in some configurations, the beam shapes 206, 208, 210, 212, 214, 216, 218 and/or the channel patterns 204A-N can have a same circular or pseudo/partly circular shape. Moreover, the beam shapes 206, 208, 210, 212, 214, 216, 218 can fit (or can be tiled) within the channel patterns 204A-N, enabling greater signal directivity and a larger instantaneous field of view within the overall channel pattern.

Figure 3:
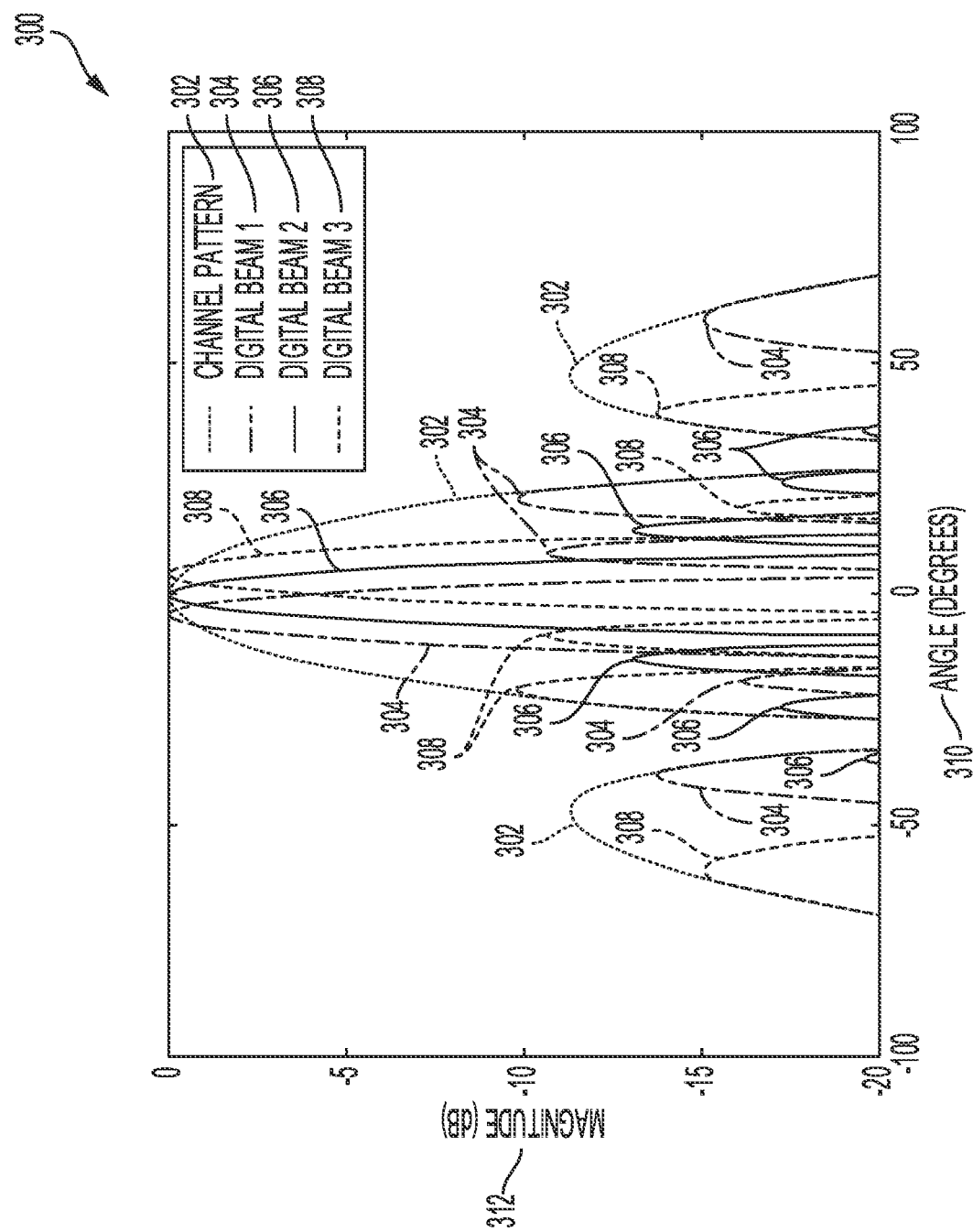
FIG. 3 illustrates a chart plotting example patterns generated by a multi-channel RX array system, in accordance with some examples.

FIG. 3 illustrates a chart 300 plotting example patterns generated by the multi-channel RX array system 100 along a first axis 310 representing angle values and a second axis 312 representing magnitudes. The multi-channel RX array system 100 can generate the channel pattern 302 using analog beamforming, and form the digital beams 304-308 over the channel pattern 302 using digital beamforming. As illustrated, the digital beams 304-308 are more narrow than the shapes of the channel pattern 302, allowing the multi-channel RX array system 100 to see farther out with the digital beams 304-308 than the analog beam (e.g., 302).

In this example, the shapes of the digital beams 304-308 and the channel pattern 302 are semi-circular. Moreover, the digital beams 304-308 can be formed to fit within the channel pattern 302. For example, the digital beams 304-308 from channel 102 are digitally formed/steered within different regions of the different shapes in the channel pattern 302, the digital beams 304-308 from the channel 104 are digitally formed/steered within different regions of the different shapes in the channel pattern 302, and the digital beams 304-308 from the channel 106 are digitally formed/steered within yet different regions of the different shapes in the channel pattern 302.

Moreover, the digital beams 304-308 can be directed towards different targets such as intended targets, unwanted targets, sources of noise or interference, etc. For example, digital beams 304 can represent nulls directed to sources of interference or noise through digital null steering, digital beams 306 can represent beams digitally steered toward intended targets such as an aircraft or any other object, and digital beams 308 can represent beams digital steered toward unwanted targets (e.g., an unwanted aircraft or any other unwanted object) or different intended targets.

Figure 4:
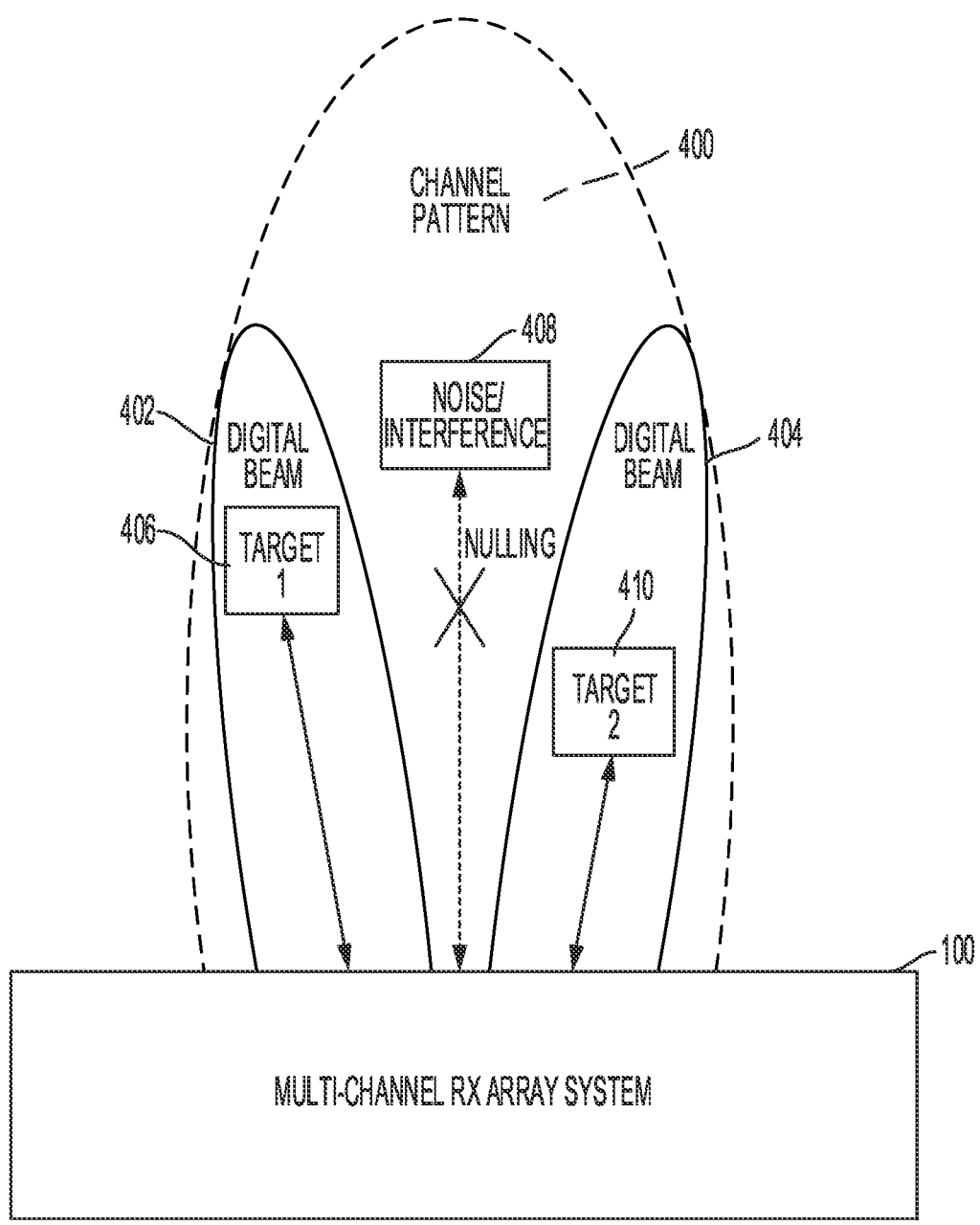
FIG. 4 illustrates example patterns generated by a multi-channel RX array system, in accordance with some examples.

FIG. 4 illustrates example patterns generated by the multi-channel RX array system 100. In this example, the multi-channel RX array system 100 can generate a channel pattern 400 formed by analog beamforming, and digital beams 402 and 404 representing different beam patterns generated by digital beamforming using multiple channels (e.g., 102, 104, 106). The channel pattern 400 can represent an analog beam or sum beam generated by one or more channels (e.g., 102, 104, 106) in the multi-channel RX array system 100.

As illustrated in this example, the digital beams 402 and 404 are steered in different directions within the channel pattern 400 and towards different targets. For example, digital beam 402 is formed at a particular time within the channel pattern 400 and digitally steered toward a first target 406. Moreover, digital beam 406 is formed at a given time within the channel pattern 400 and digitally steered toward a second target 410, and digital beam 404 is a null formed at a particular time within the channel pattern 400 and digital steered (e.g., via digital null steering) toward a source of noise/interference 408.)

The multiple channels (e.g., 102, 104, 106), the channel pattern 400, and the digital beams 402, 404 allow the multi-channel RX array system 100 to operate in clutter, nulling out clutter (e.g., 408) that appears within the same or similar range and/or doppler bins as a target of interest and allowing the signal for the target of interest to remain clean.

Figure 5:
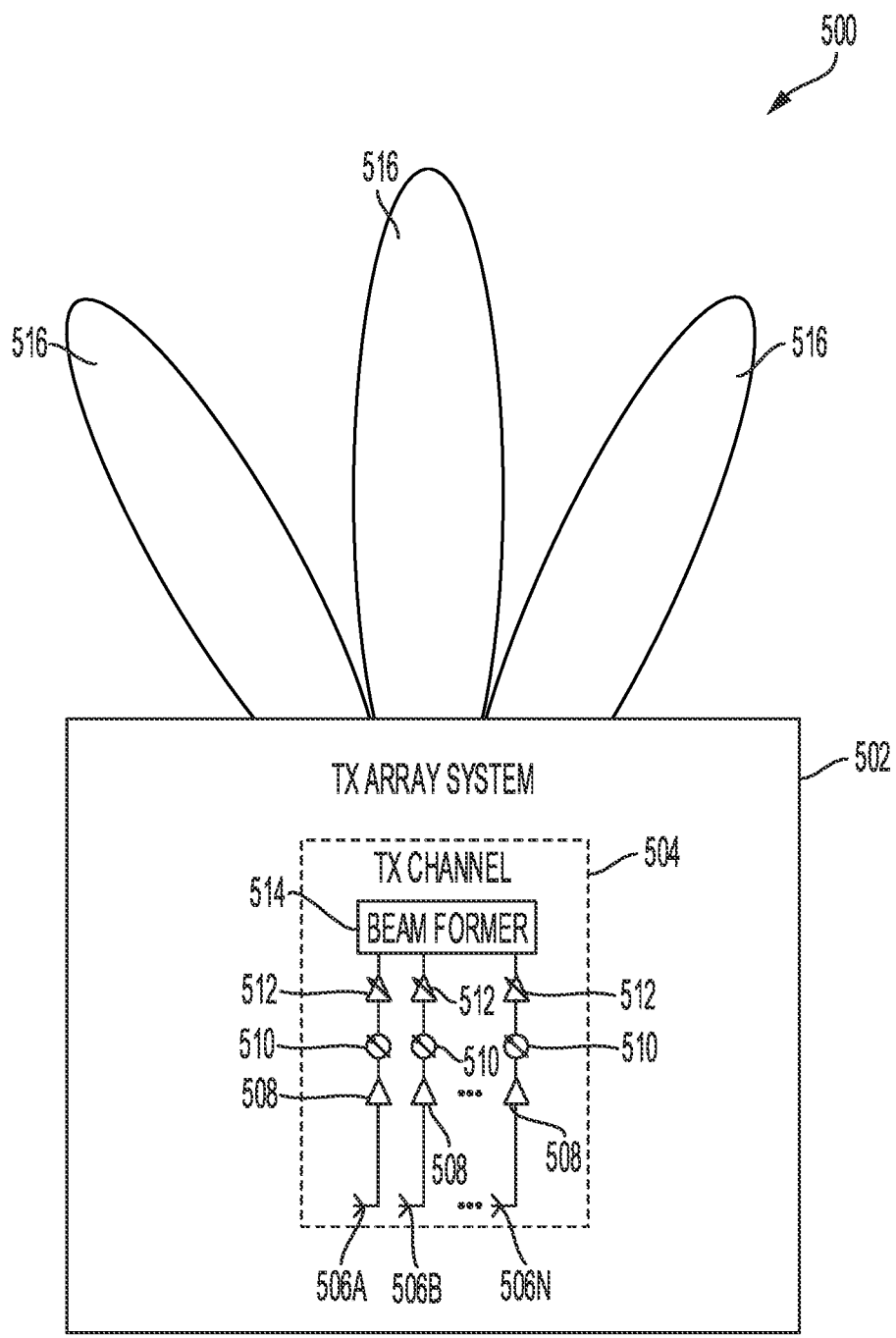
FIG. 5 illustrates an example configuration of a TX array system for steering and transmitting signals, in accordance with some examples.

FIG. 5 illustrates an example configuration 500 of a TX array system 502 for steering and transmitting signals. The TX array system 502 can transmit beams formed with a particular shape(s) and steered in a particular direction(s). The transmitted beams can be reflected from one or more objects and the returned signals can be received by the multi-channel RX array system 100.

In this example, the TX array system 502 can include a TX channel 504 defined by a group of antenna elements 506A-N and a group of components (508, 510, 512, 514) for beamforming. The group of components can include, for example, LNAs 508, phase shifters 510, VGAs 512 and one or more beamformer elements 514.

The signal from each antenna element 506A-N in the TX channel 504 can be fed through a respective LNA 508. The LNA 508 can amplify or boost the signal to a particular level to overcome any noise of the following circuits or components. A respective phase shifter 510 can perform invariable phase shifting or invariable time delay on the amplified signal, and a VGA 512 can adjust the gain of the output from the phase shifter 510 to compensate for variable losses. The resulting signals from each antenna element 506A-N can be summed by a beamformer element 514 to produce a beam 516 that is steered in a particular direction. The beam 516 can have a particular beam pattern having one or more specific shapes.

In some cases, the TX array system 502 can be configured to produce a beam pattern having the same (or similar) size and shape as the channel pattern (e.g., 204A-N, 302, 400) produced by the multi-channel RX array system 100. Having the same or similar transmit beam pattern as the receive beam pattern can ensure that all (or almost all) of the energy transmitted by the TX array system 502 is received back by the multi-channel RX array system 100. Moreover, gain can be maximized when each RX channel (e.g., 102, 104, 106) is matched to the TX channel 504. Accordingly, in some implementations, the TX array can have a similar or same size and shape as the RX channels (e.g., 102, 104, 106) so the power transmitted can be retrieved by the multi-channel RX array system 100.

In some aspects, the transmit beam pattern (e.g., 516) can be configured to be a wide beam in order to illuminate a large area. In some cases, the transmit beam pattern (e.g., 516) can be as wide (or similarly wide) as the channel pattern produced by the multi-channel RX array system 100 after performing analog beamforming. Thus, the trasnsmit beam 516 can illuminate a large area, which allows the multi-channel RX array system 100 to scan over the large area to recapture any information from that area.

Figure 6A:
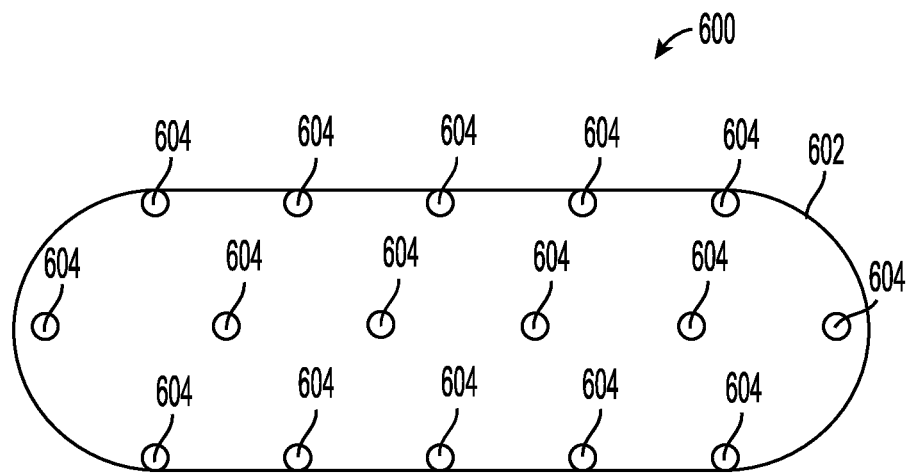
FIGS. 6A and 6B illustrate example array configurations of antenna elements, in accordance with some examples.

FIG. 6A illustrates an array configuration 600 of antenna elements 604. The array configuration 600 includes a perimeter 602 around an array of antenna elements 604 to depict a resulting oval shape of the array configuration 600. The antenna elements 604 can be spaced within one or more distances d of each other. In some implementations, the antenna elements 604 can be tiled to fit together without overlapping.

Figure 6B:
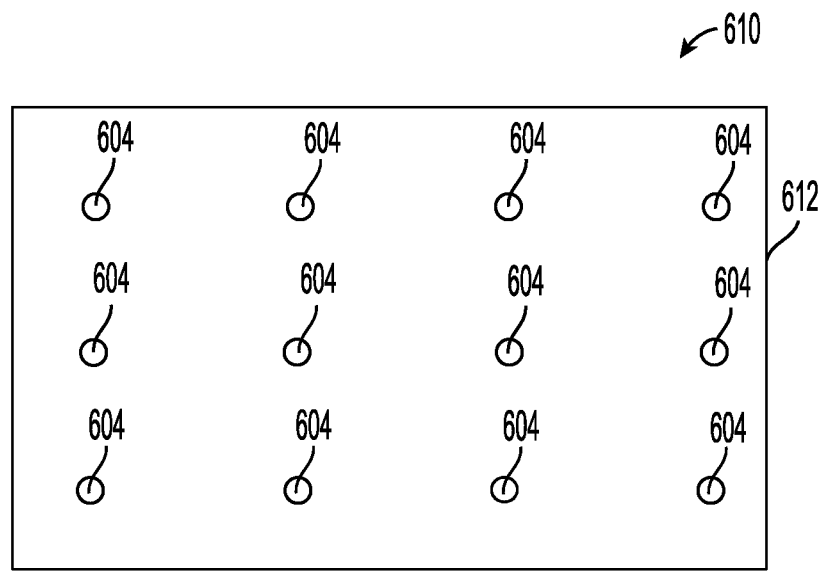

In other implementations, the array of antenna elements 604 can have a different configuration and/or shape, such as a square shape, a rectangular shape, a circular shape, a semi or pseudo circular shape, a trapezoidal shape, or any other symmetric or asymmetric shape. For example, FIG. 6B illustrates another array configuration 610 of antenna elements 604 which includes a perimeter 612 around an array of antenna elements 604 to depict a resulting rectangular shape of the array configuration 610. The antenna elements 604 can be spaced within one or more distances d of each other. In some implementations, the antenna elements 604 can be tiled to fit together without overlapping.

The array configuration 600 shown in FIG. 6A and the array configuration 610 shown in FIG. 6B can be implemented by the multi-channel RX array system 100 and/or the TX array system 500. For example, the array configuration 600 or the array configuration 610 can be used to configure the size, shape, arrangement, etc., of antenna elements in the channels 102, 104, 106 of the multi-channel RX array system 100 and/or the TX channel 504 of the TX array system 500.

Figure 6C:
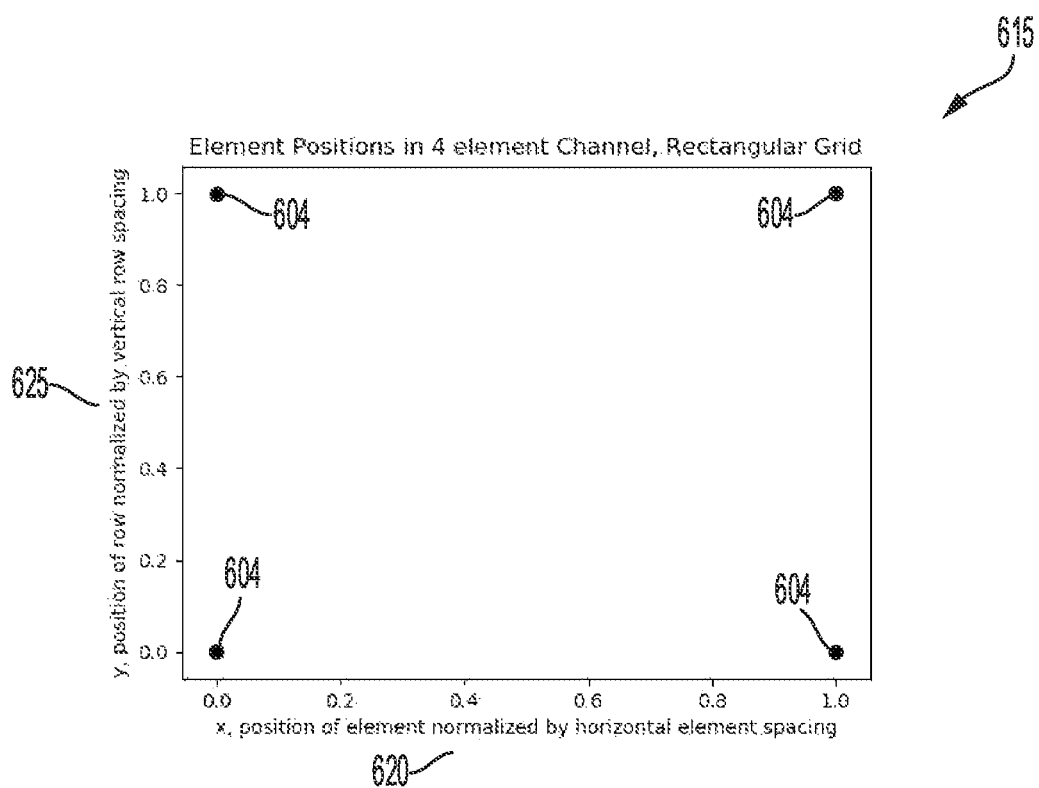
FIG. 6C illustrates a rectangular grid depicting an example configuration of antenna elements in a four element rectangular channel.

Other array configurations are also contemplated herein. For example, FIG. 6C illustrates an example rectangular grid 615 depicting a configuration of antenna elements 604 in a four element rectangular channel. The grid 615 illustrates a position of each of the four antenna elements 604 along a horizontal plane 620 (X) and a vertical plane 625 (Y) and a spacing between the antenna elements 604.

Figure 6D:
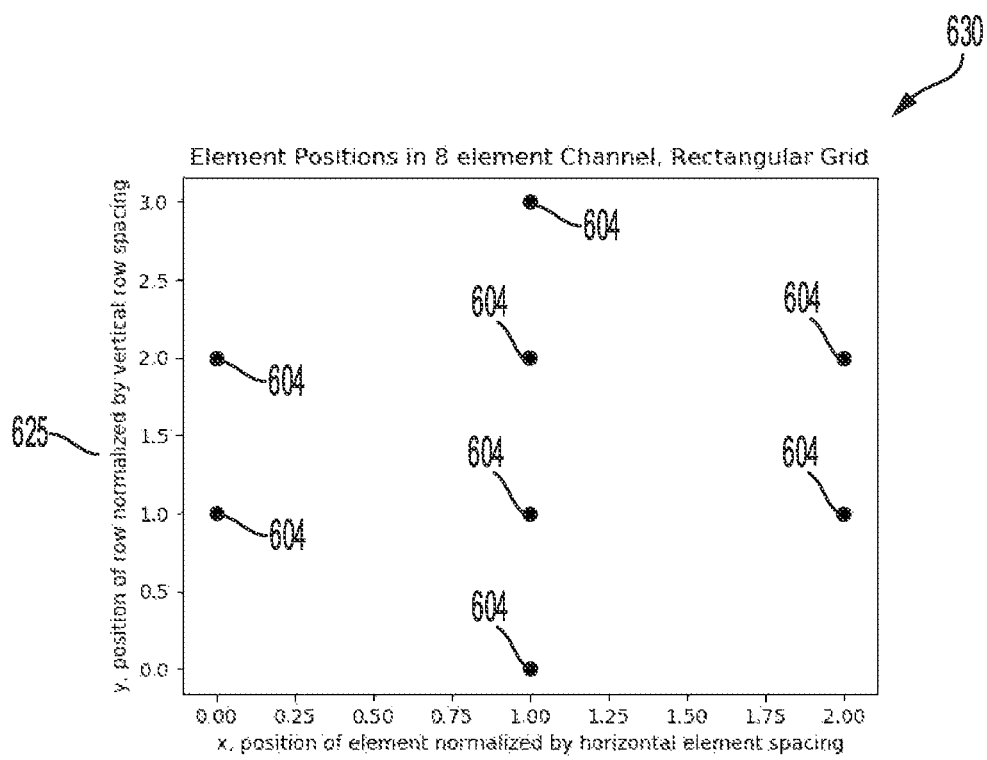
FIG. 6D illustrates a rectangular grid depicting an example configuration of antenna elements in an eight element rectangular channel.

FIG. 6D illustrates an example rectangular grid 630 depicting a configuration of antenna elements 604 in an eight element rectangular channel. The grid 630 illustrates a position of each of the eight antenna elements 604 along a horizontal plane 620 (X) and a vertical plane 625 (Y) and a spacing between the antenna elements 604.

Figure 6E:
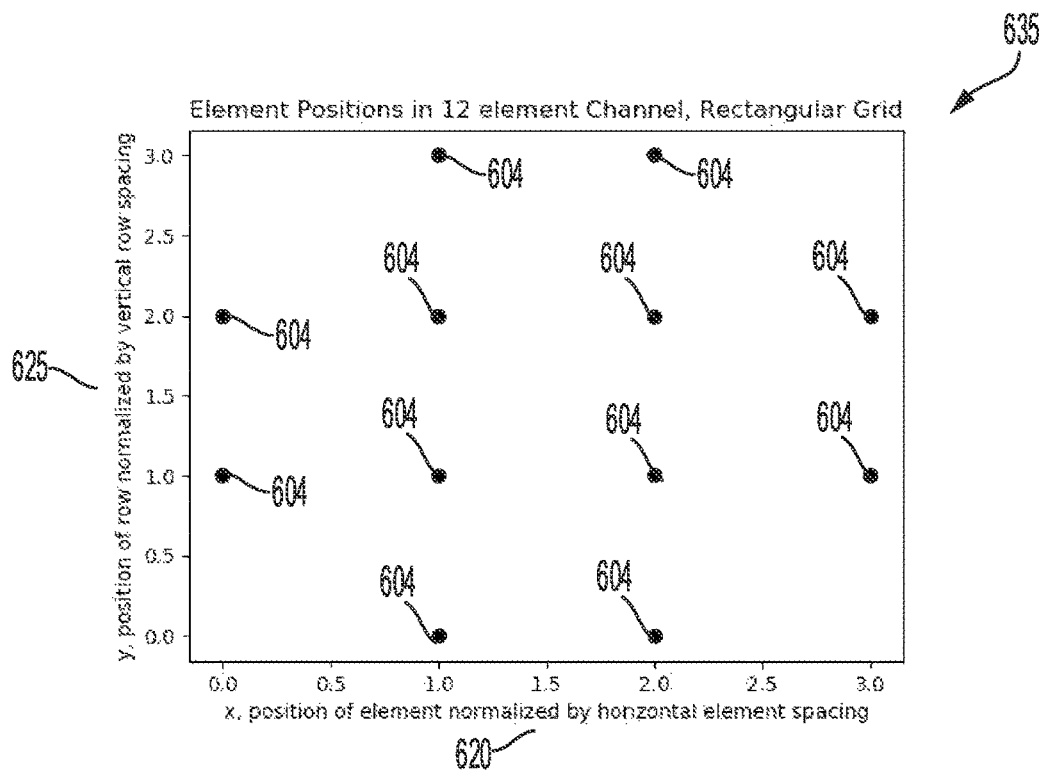
FIG. 6E illustrates a rectangular grid depicting an example configuration of antenna elements in a twelve element rectangular channel.

FIG. 6E illustrates an example rectangular grid 635 depicting a configuration of antenna elements 604 in a twelve element rectangular channel. The grid 635 illustrates a position of each of the twelve antenna elements 604 along a horizontal plane 620 (X) and a vertical plane 625 (Y) and a spacing between the antenna elements 604.

Figure 6F:
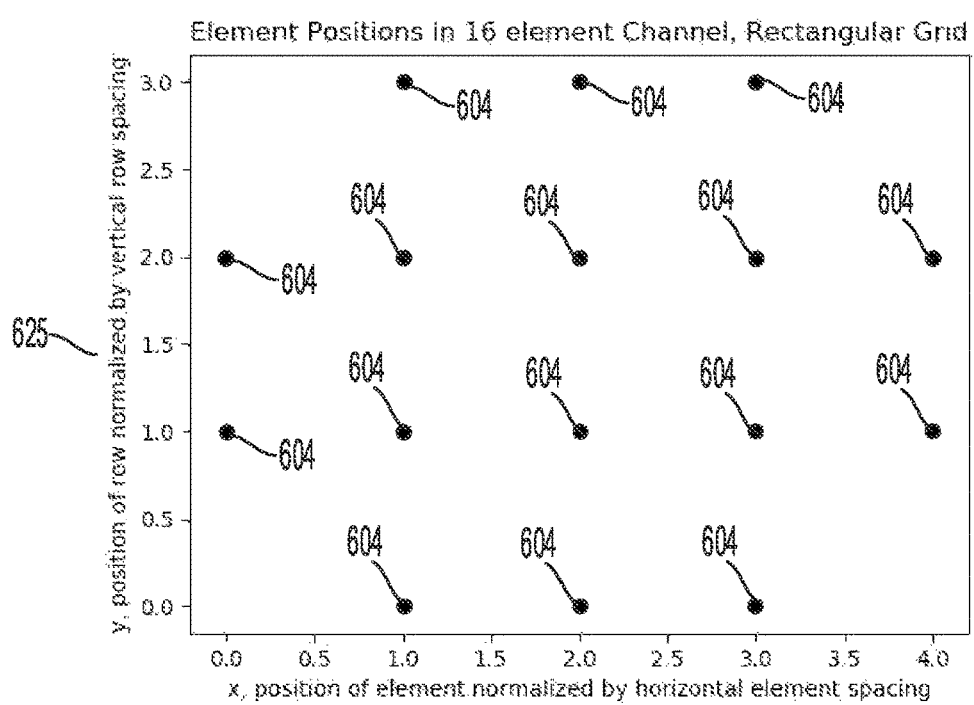
FIG. 6F illustrates a rectangular grid depicting an example configuration of antenna elements in a sixteen element rectangular channel.

FIG. 6F illustrates an example rectangular grid 640 depicting a configuration of antenna elements 604 in a sixteen element rectangular channel. The grid 640 illustrates a position of each of the sixteen antenna elements 604 along a horizontal plane 620 (X) and a vertical plane 625 (Y) and a spacing between the antenna elements 604.

Figure 6G:
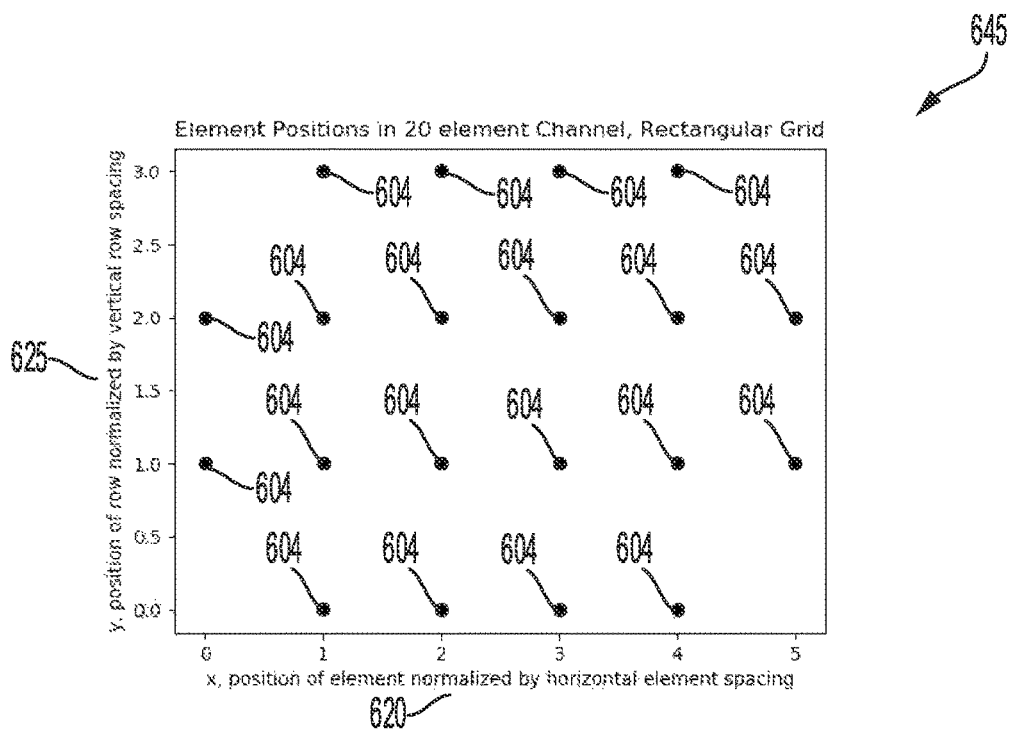
FIG. 6G illustrates a rectangular grid depicting an example configuration of antenna elements in a twenty element rectangular channel.

FIG. 6G illustrates an example rectangular grid 645 depicting a configuration of antenna elements 604 in a twenty element rectangular channel. The grid 645 illustrates a position of each of the twenty antenna elements 604 along a horizontal plane 620 (X) and a vertical plane 625 (Y) and a spacing between the antenna elements 604.

Figure 6H:
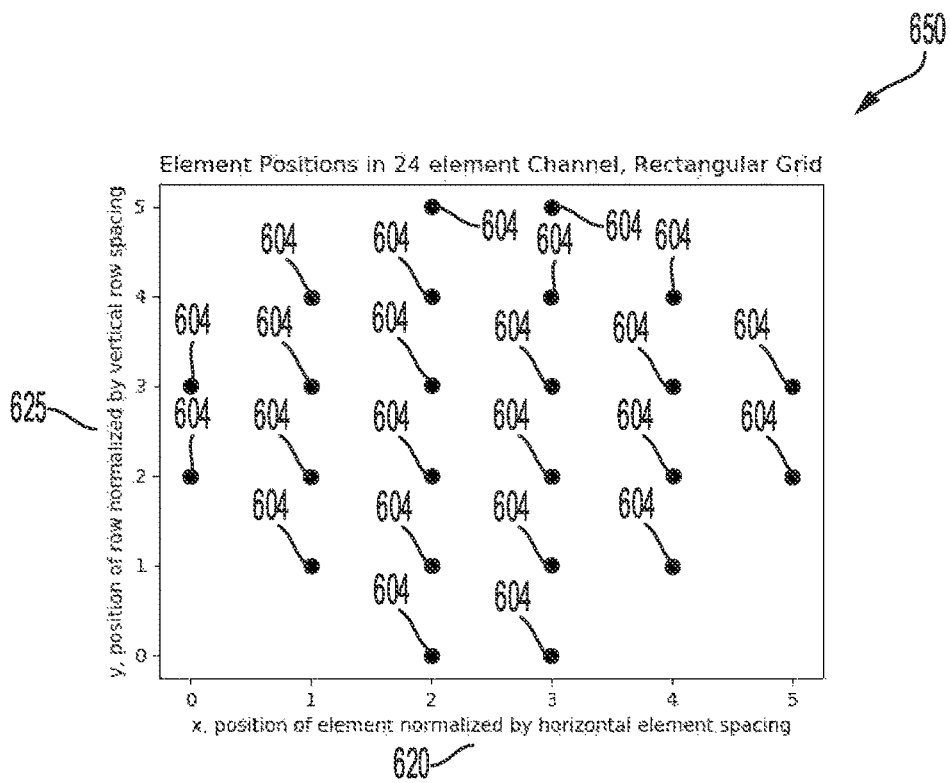
FIG. 6H illustrates a rectangular grid depicting an example configuration of antenna elements in a twenty-four element rectangular channel.

FIG. 6H illustrates an example rectangular grid 650 depicting a configuration of antenna elements 604 in a twenty-four element rectangular channel. The grid 640 illustrates a position of each of the twenty-four antenna elements 604 along a horizontal plane 620 (X) and a vertical plane 625 (Y) and a spacing between the antenna elements 604.

Figure 6I:
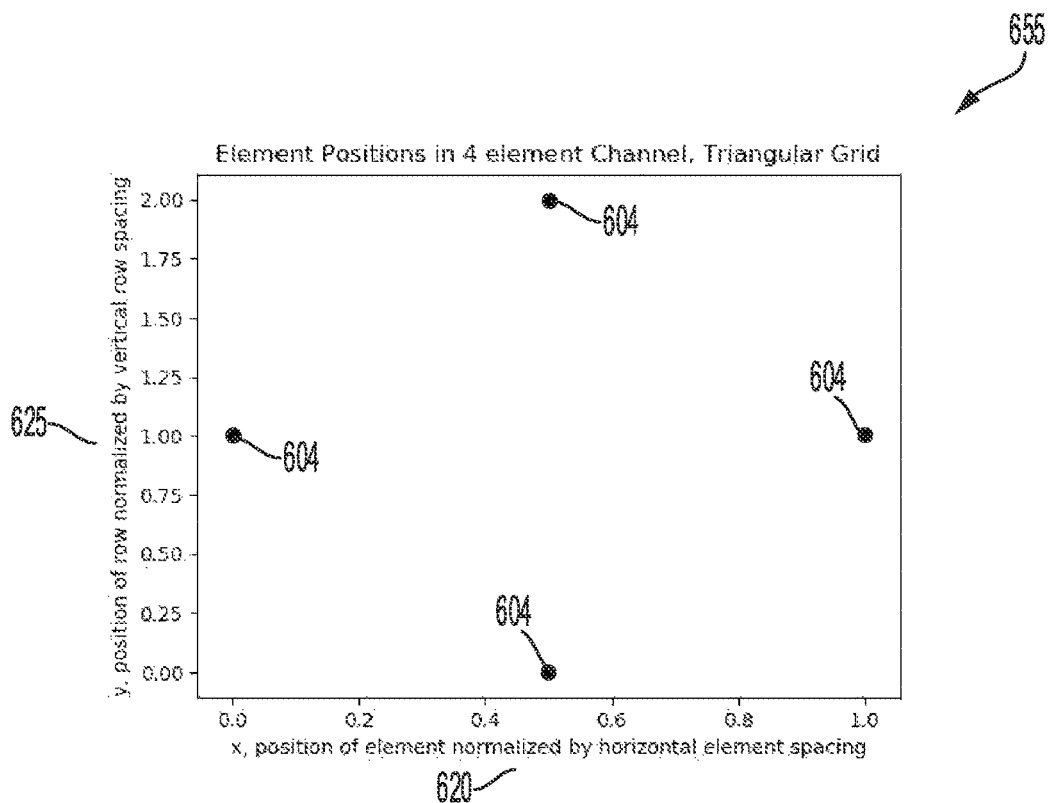
FIG. 6I illustrates a triangular grid depicting an example configuration of antenna elements in a four element triangular channel.

FIG. 6I illustrates an example triangular grid 655 depicting a configuration of antenna elements 604 in a four element triangular channel. The grid 655 illustrates a position of each of the four antenna elements 604 along a horizontal plane 620 (X) and a vertical plane 625 (Y) and a spacing between the antenna elements 604.

Figure 6J:
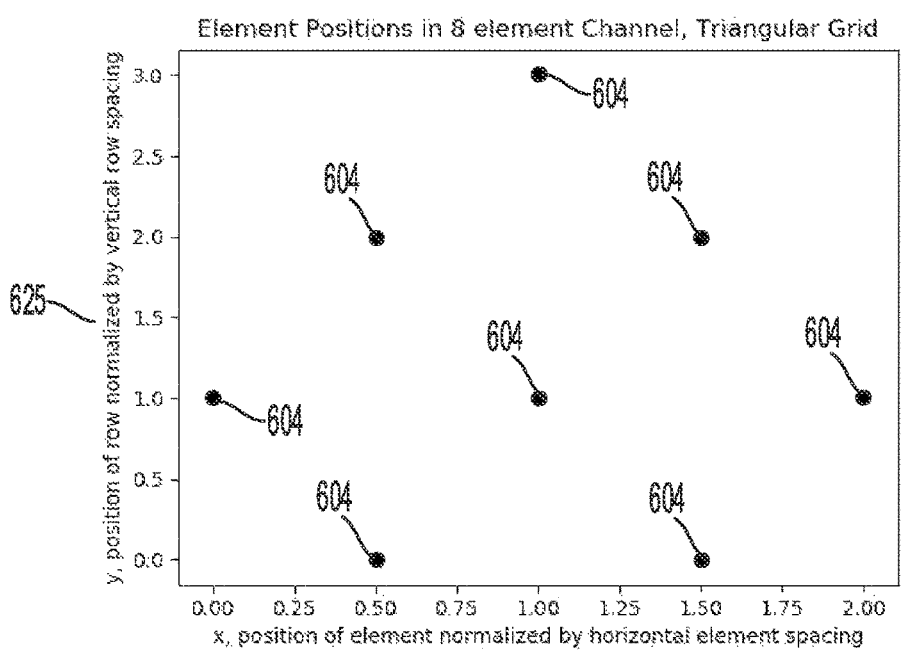
FIG. 6J illustrates a triangular grid depicting an example configuration of antenna elements in an eight element triangular channel.

FIG. 6J illustrates an example triangular grid 660 depicting a configuration of antenna elements 604 in an eight element triangular channel. The grid 660 illustrates a position of each of the eight antenna elements 604 along a horizontal plane 620 (X) and a vertical plane 625 (Y) and a spacing between the antenna elements 604.

Figure 6K:
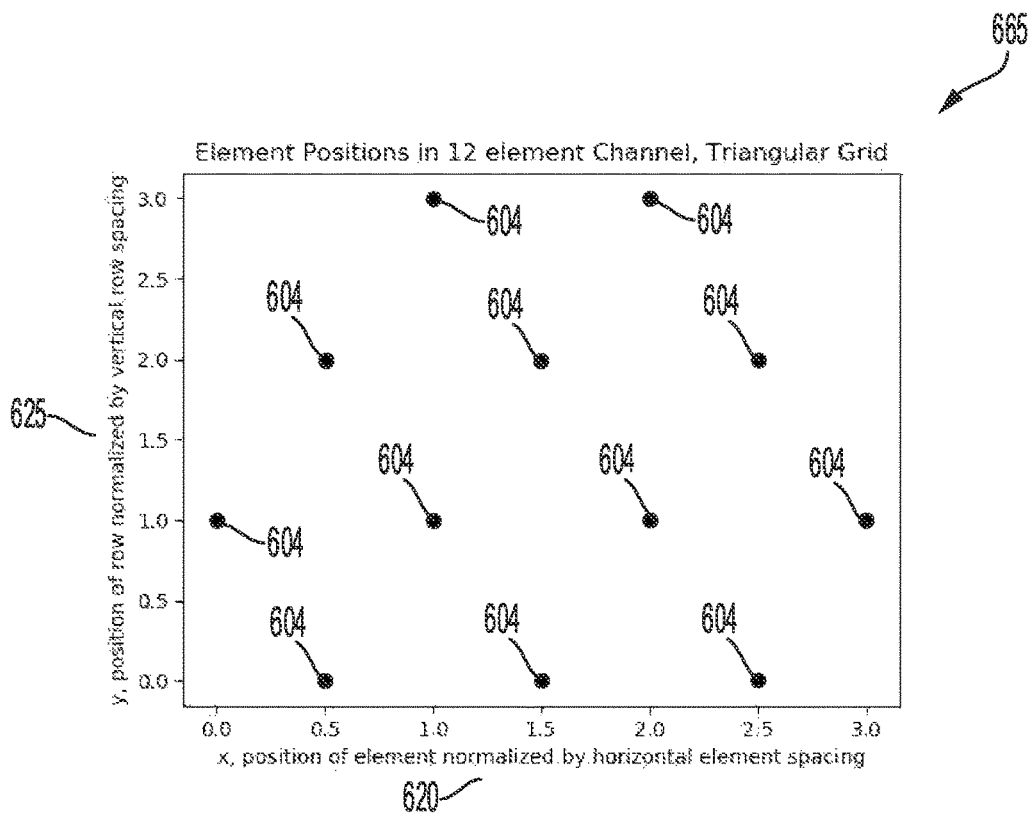
FIG. 6K illustrates a triangular grid depicting an example configuration of antenna elements in a twelve element triangular channel.

FIG. 6K illustrates an example triangular grid 665 depicting a configuration of antenna elements 604 in a twelve element triangular channel. The grid 665 illustrates a position of each of the twelve antenna elements 604 along a horizontal plane 620 (X) and a vertical plane 625 (Y) and a spacing between the antenna elements 604.

Figure 6L:
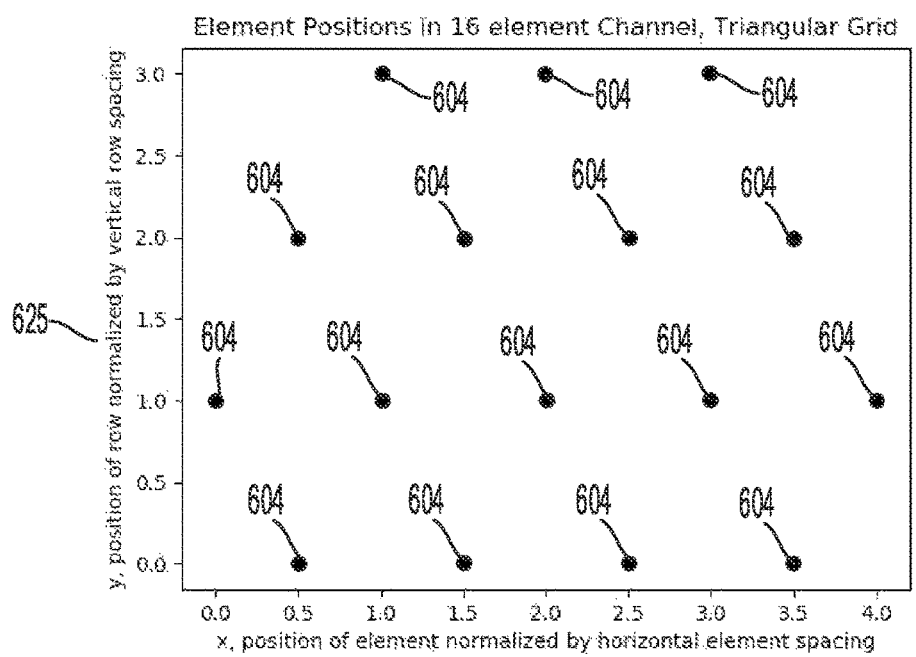
FIG. 6L illustrates a triangular grid depicting an example configuration of antenna elements in a sixteen element triangular channel.

FIG. 6L illustrates an example triangular grid 670 depicting a configuration of antenna elements 604 in a sixteen element triangular channel. The grid 670 illustrates a position of each of the sixteen antenna elements 604 along a horizontal plane 620 (X) and a vertical plane 625 (Y) and a spacing between the antenna elements 604.

Figure 6M:
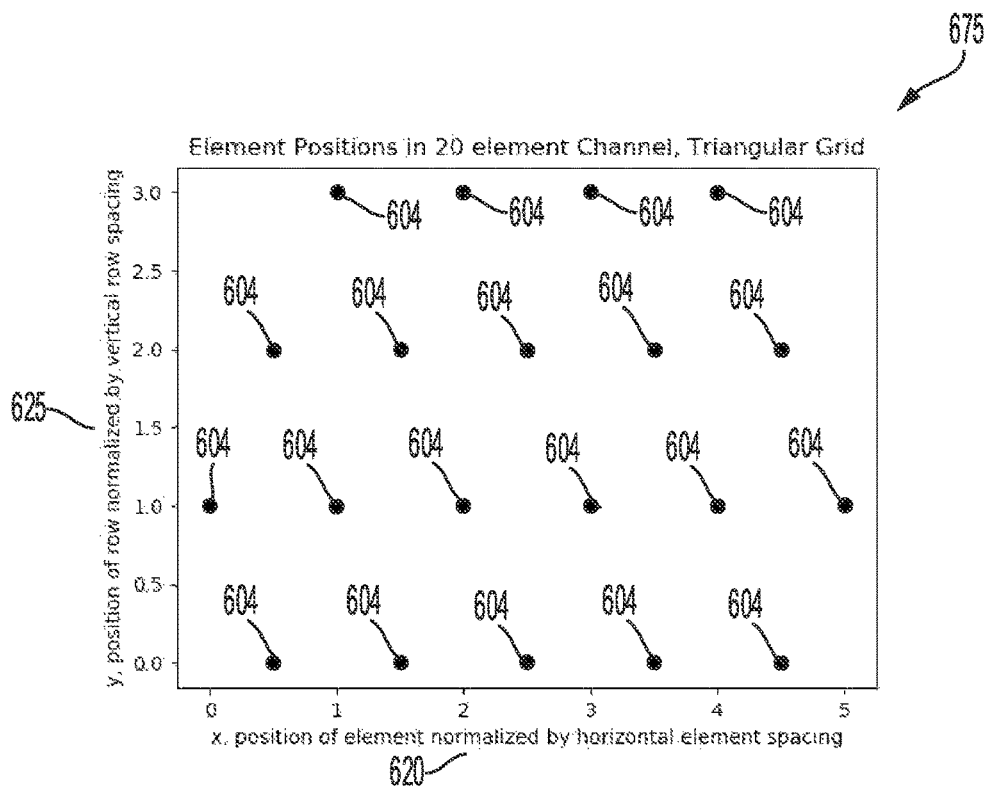
FIG. 6M illustrates a triangular grid depicting an example configuration of antenna elements in a twenty element triangular channel.

FIG. 6M illustrates an example triangular grid 675 depicting a configuration of antenna elements 604 in a twenty element triangular channel. The grid 675 illustrates a position of each of the twenty antenna elements 604 along a horizontal plane 620 (X) and a vertical plane 625 (Y) and a spacing between the antenna elements 604.

Figure 6N:
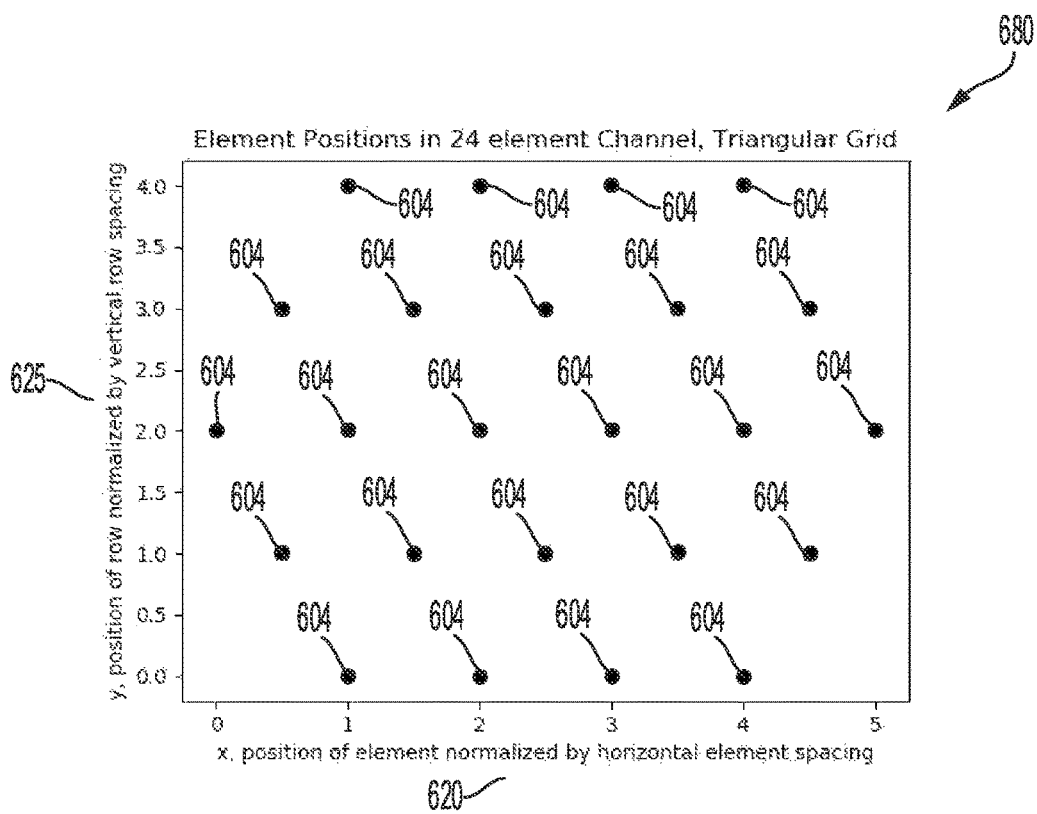
FIG. 6N illustrates a triangular grid depicting an example configuration of antenna elements in a twenty-four element triangular channel.

FIG. 6N illustrates an example triangular grid 680 depicting a configuration of antenna elements 604 in a twenty-four element triangular channel. The grid 680 illustrates a position of each of the twenty-four antenna elements 604 along a horizontal plane 620 (X) and a vertical plane 625 (Y) and a spacing between the antenna elements 604.

Having disclosed example system components and concepts, the disclosure now turns to the example method for combining digital and analog beamsteering in a channelized antenna array (e.g., 100), as shown in FIG. 7. For the sake of clarity, the method is described with reference to the multi-channel RX array system 100 shown in FIG. 1. The steps outlined herein are examples and can be implemented in any combination thereof, including combinations that exclude, add, or modify certain steps.

At step 702, the method can include receiving one or more signals at each of a plurality of groups of antenna elements (112A-N, 120A-N, 128A-N), each group of antenna elements defining a respective channel from a plurality of channels (102, 104, 106). In some cases, receiving the one or more signals can include receiving at least one signal at each antenna element (112A-N, 120A-N, 128A-N) in each channel (102, 104, 106).

In some aspects, the groups of antenna elements (112A-N, 120A-N, 128A-N) and the channels (102, 104, 106) can be part of a multi-channel RX array system (100). Moreover, the plurality of groups of antenna elements (112A-N, 120A-N, 128A-N), the plurality of channels (102, 104, 106) and/or the multi-channel RX array system (100) can be part of a radar system or device.

In some examples, the group of antenna elements (112A-N, 120A-N, 128A-N) associated with each channel (102, 104, 106) can include at least two different antenna elements. In other examples, the group of antenna elements (112A-N, 120A-N, 128A-N) associated with each channel (102, 104, 106) can include more or less than two different antenna elements.

In some aspects, each respective channel (102, 104, 106) can include a group of antenna elements (112A-N, 120A-N, 128A-N), phase shifters (e.g., 116A-N, 124A-N, or 132A-N) and amplifier elements (e.g., 114A-N, 122A-N, or 130A-N and/or 118A-N, 126A-N, or 134A-N). For example, channel 102 can include antenna elements 114A-N, phase shifters 116A-N, and amplifier elements 114A-N and 118A-N; channel 104 can include antenna elements 120A-N, phase shifters 124A-N, and amplifier elements 122A-N and 126A-N; and channel 106 can include antenna elements 128A-N, phase shifters 132A-N, and amplifier elements 130A-N and 134A-N.

Moreover, each antenna element from the group of antenna elements (112A-N, 120A-N, 128A-N) can be associated with a specific phase shifter and at least one amplifier element. To illustrate using antenna elements 112A-N in channel 102 as an example, antenna element 112A can be associated with (e.g., can implement, can be electrically coupled with, etc.) phase shifter 116A and amplifier elements 114A and 118A, while antenna element 112B is instead associated with phase shifter 116B and amplifier elements 114B and 118B and antenna element 112N is associated with phase shifter 116N and amplifier elements 114N and 118N. In some cases, the at least one amplifier element can include a low-noise amplifier (e.g., 114A-N, 122A-N, 130A-N) and a variable-gain amplifier (e.g., 118A-N, 126A-N, 134A-N).

At step 704, the method can include steering, by each respective channel (102, 104, 106) and using analog steering, the one or more signals in a respective direction to yield a steered analog signal pattern. In some cases, the method can include steering each channel's (102, 104, 106) signal in a same direction using analog steering and/or beamforming to generate a steered analog signal pattern.

In some aspects, steering the one or more signals can include, at each channel (102, 104, 106), applying, to each signal received at each antenna element (112A-N, 120A-N, 128A-N) in the channel, a low-noise amplifier (114A-N, 122A-N, 130A-N) associated with that antenna element to yield a modified signal; at each channel (102, 104, 106), applying, to the modified signal, the phase shifter associated with the antenna element in the channel to yield a second modified signal; applying, to the second modified signal, the variable-gain amplifier associated with the antenna element in the channel to yield a third modified signal; and performing a summation of the third modified signal associated with each antenna element in the channel to yield an output representing the steered analog signal pattern.

At step 706, the method can include converting (e.g., using ADCs 108A-N) the steered analog signal pattern associated with each respective channel (102, 104, 106) into a respective digital signal (140A-N). For example, the method can include receiving the steered analog signal pattern associated with each channel and digitizing the steered analog signal using an ADC (e.g., 108A, 108B, 108N).

At step 708, the method can include, based on the respective digital signal (140A-N), generating, using digital steering (e.g., via digital signal processing system 110), one or more steered digital signal patterns (160), the one or more steered digital signal patterns being steered within the steered analog signal pattern associated with the respective digital signal (140A-N). In some cases, generating the one or more steered digital signal patterns can include using the plurality of channels (102, 104, 106) to form and/or steer respective digital beams in different directions. For example, channel 102 can be used to steer a digital beam in one direction while simultaneously using channels 104 and 106 to steer other digital beams in other directions.

In some aspects, generating the one or more steered digital signal patterns can include steering, based on the respective digital signal associated with at least one of the plurality of channels (e.g., channel 102), one or more nulls in one or more directions associated with a source of interference and/or an unwanted target, and steering a plurality of digital signals associated with a set of channels (e.g., channels 104 and 106) from the plurality of channels. In some cases, the one or more directions can be steered at least partly within the steered analog signal pattern and the plurality of digital signals can be steered in one or more different directions associated with one or more targets.

In some examples, steering the at least one of the plurality of digital signals and the one or more nulls can be based on data collected via at least one of the plurality of channels. Moreover, in some cases, at least a portion of the data can be obtained or collected from at least one of the one or more signals received at each of the plurality of groups of antenna elements (e.g., 112A-N, 120A-N, 128A-N).

For example, the multi-channel RX array system 100 can collect data from signals received by one or more of the channels (102, 104, 106) and/or antenna elements (112A-N, 120A-N, 128A-N), and use the collected data to determine where or how to steer one or more of the plurality of digital signals. The collected data can be used to identify potential targets, unwanted targets, sources of interference, clutter, potential directions for steering, characteristics of an area covered or illuminated by the signals received by the multi-channel RX array system 100 and used to collect the data, etc. This information can be used to tailor, fine tune, determine, or optimize the directions and patterns of the digital beams.

In some examples, generating one or more steered digital signal patterns can include generating a plurality of steered digital beams (e.g., 160), where each of the plurality of steered digital beams is associated with one or more channels (102, 104, 106) and each of the plurality of steered digital beams is steered in a different direction within the steered analog signal pattern.

In some cases, the plurality of channels can have a tiled arrangement such that all of the plurality of channels fit together within the overall design without overlapping. In some implementations, at least some of the plurality of channels can have a circular shape, a partly circular shape, a same shape, a tillable shape, a diamond shape, an elliptical shape, one or more different shapes, and/or any other shape. Moreover, in some implementations, the plurality of channels can include at least three channels.

In some aspects, steering the one or more signals in the respective direction to yield the steered analog signal pattern can include steering one or more nulls in one or more directions associated with a source of interference and/or an unwanted target, the one or more directions being at least partly within the steered analog signal pattern; and steering a plurality of analog signals associated with a set of channels from the plurality of channels, the plurality of analog signals being steered in one or more different directions associated with one or more targets.

Also, in some examples, steering the plurality of analog signals and/or the one or more nulls can be based on data collected via at least one of the plurality of channels. In some cases, at least a portion of the data can be collected from at least one of the one or more signals received at each of the plurality of groups of antenna elements.

In some aspects, the method can further include transmitting one or more beams via a TX array system (e.g., 502). In some cases, the one or more beams transmitted can be formed and shaped to have a same or similar size, shape and/or pattern as the steered analog signal pattern so the multi-channel RX array system (100) can retrieve all or most of the power transmitted by the TX array system.

The disclosure now turns to FIG. 8, which illustrates an example computing system architecture including various hardware components which can be implemented with a radar device, antenna system and/or any other computing device to perform computing operations.

In this example, FIG. 8 illustrates a computing system architecture for an example computing system 800, including components in electrical communication with each other using a connection 805, such as a bus. System 800 includes a processing unit (CPU or processor) 810 and a system connection 805 that couples various system components including the system memory 815, such as read only memory (ROM) 820 and random access memory (RAM) 825, to the processor 810. The system 800 can include a cache of high-speed memory connected directly with, in close proximity to, or integrated as part of the processor 810. The system 800 can copy data from the memory 815 and/or the storage device 830 to the cache 812 for quick access by the processor 810. In this way, the cache can provide a performance boost that avoids processor 810 delays while waiting for data. These and other modules can control or be configured to control the processor 810 to perform various actions. Other system memory 815 may be available for use as well.

The memory 815 can include multiple different types of memory with different performance characteristics. The processor 810 can include any general purpose processor and a hardware or software service, such as service 1 832, service 2 834, and service 3 836 stored in storage device 830, configured to control the processor 810 as well as a special-purpose processor where software instructions are incorporated into the actual processor design. The processor 810 may be a completely self-contained computing system, containing multiple cores or processors, a bus, memory controller, cache, etc. A multi-core processor may be symmetric or asymmetric.

To enable user interaction with the computing device 800, an input device 845 can represent any number of input mechanisms, such as a microphone for speech, a touch-sensitive screen for gesture or graphical input, keyboard, mouse, motion input, speech and so forth. An output device 835 can also be one or more of a number of output mechanisms known to those of skill in the art. In some instances, multimodal systems can enable a user to provide multiple types of input to communicate with the computing device 800. The communications interface 840 can generally govern and manage the user input and system output. There is no restriction on operating on any particular hardware arrangement and therefore the basic features here may be substituted for improved hardware or firmware arrangements as they are developed.

Storage device 830 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 825, read only memory (ROM) 820, and hybrids thereof.

The storage device 830 can include services 832, 834, 836 for controlling the processor 810. Other hardware or software modules are contemplated. The storage device 830 can be connected to the system connection 805. In one aspect, a hardware module that performs a particular function can include the software component stored in a computer-readable medium in connection with the necessary hardware components, such as the processor 810, connection 805, output device 835, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" refers to at least one of a set and indicates that one member of the set or multiple members of the set satisfy the claim. For example, claim language reciting "at least one of A and B" means A, B, or A and B. In other words, claim language reciting "at least one of a first element and a second element" means a first element and/or a second element.

We claim:

1. A method comprising:
   based on a steered analog signal pattern generated based on a respective channel from a plurality of channels defined by a plurality of groups of antenna elements, generating, using digital steering, one or more steered digital signal patterns, the one or more steered digital signal patterns being confined within the steered analog signal pattern such that each of the one or more steered digital signal patterns, when combined with others of the one or more steered digital signal patterns, contributes to a combination of signal patterns having a similar shape as the steered analog signal pattern, wherein having more signals patterns in the combination of signal patterns relative to less signal patterns in the combination of signal patterns increases how similar the similar shape of the combination of signals patterns is to the steered analog signal pattern; and
   transmitting, via a transmitter, one or more transmit signals according to the one or more steered digital signal patterns.

2. The method of claim 1, further comprising:
   steering, by each respective channel and using analog steering, one or more signals in a respective direction to yield the steered analog signal pattern.

3. The method of claim 2, further comprising:
   generating the one or more steered digital signal patterns by:
   based on a respective steered analog signal pattern associated with at least one of the plurality of channels, steering one or more nulls in one or more directions associated with at least one of a source of interference and an unwanted target, the one or more directions being at least partly within the steered analog signal pattern; and
   steering a plurality of digital signals associated with a set of channels from the plurality of channels, the plurality of digital signals being steered in one or more different directions associated with one or more targets.

4. The method of claim 3, wherein steering at least one of the plurality of digital signals and the one or more nulls is based on data collected via at least one of the plurality of channels.

5. The method of claim 4, wherein at least a portion of the data is collected from at least one of the one or more signals received at each of the plurality of groups of antenna elements.

6. The method of claim 2, wherein steering the one or more signals in the respective direction to yield the steered analog signal pattern comprises:
   steering one or more nulls in one or more directions associated with at least one of a source of interference and an unwanted target, the one or more directions being at least partly within the steered analog signal pattern; and
   steering a plurality of analog signals associated with a set of channels from the plurality of channels, the plurality of analog signals being steered in one or more different directions associated with one or more targets.

7. The method of claim 6, wherein steering at least one of the plurality of analog signals and the one or more nulls is based on data collected via at least one of the plurality of channels, wherein at least a portion of the data is collected from at least one of the one or more signals received at each of the plurality of groups of antenna elements.

8. The method of claim 1, wherein each respective channel comprises a group of antenna elements, phase shifters and amplifier elements, wherein each antenna element from the group of antenna elements is associated with a phase shifter and at least one amplifier element, wherein the at least one amplifier element comprises a low-noise amplifier and a variable-gain amplifier.

9. The method of claim 8, further comprising:
   receiving the one or more signals by receiving a signal at each antenna element associated with each respective channel, and wherein steering the one or more signals comprises:
   at each respective channel, applying, to each signal received at each antenna element, the low-noise amplifier associated with the antenna element to yield a first respective modified signal;
   at each respective channel, applying, to the first respective modified signal, the phase shifter associated with the antenna element to yield a second respective modified signal;
   applying, to the second respective modified signal, the variable-gain amplifier associated with the antenna element to yield a third respective modified signal; and
   performing a summation of the third respective modified signal associated with each antenna element to yield an output representing the steered analog signal pattern.

10. The method of claim 8, wherein the group of antenna elements associated with each respective channel comprises at least two different antenna elements, wherein the plurality of groups of antenna elements and the plurality of channels are associated with a radar system.

11. The method of claim 1, wherein generating the one or more steered digital signal patterns comprises generating a plurality of steered digital beams, wherein each of the plurality of steered digital beams is associated with one or more of the plurality of channels, and wherein each of the plurality of steered digital beams is steered in a different direction within the steered analog signal pattern.

12. The method of claim 1, wherein the plurality of channels comprises at least three channels, and wherein at least some of the plurality of channels have at least one of a circular shape, a partly circular shape, a same shape, a tillable shape, one or more different shapes, a diamond shape, an elliptical shape, and a tiled arrangement.

13. A system comprising:
a plurality of groups of antenna elements configured to receive one or more signals at each of the plurality of groups of antenna elements, wherein each group of antenna elements defines a respective channel from a plurality of channels, and wherein each respective channel is configured to generate a respective signal pattern based on the one or more signals, the respective signal pattern being steered in a respective direction using analog steering to yield a respective steered analog signal pattern associated with each respective channel; and
one or more processing elements configured to:
based on a steered analog signal pattern generated based on a respective channel from a plurality of channels defined by a plurality of groups of antenna elements, generating, using digital steering, one or more steered digital signal patterns, the one or more steered digital signal patterns being confined within the steered analog signal pattern such that each of the one or more steered digital signal patterns, when combined with others of the one or more steered digital signal patterns, contributes to a combination of signal patterns having a similar shape as the steered analog signal pattern, wherein having more signals patterns in the combination of signal patterns relative to less signal patterns in the combination of signal patterns increases how similar the similar shape of the combination of signals patterns is to the steered analog signal pattern; and
transmitting, via a transmitter, one or more transmit signals according to the one or more steered digital signal patterns.

14. The system of claim 13, wherein the one or more processing elements are further configured to perform operations comprising:
steering, by each respective channel and using analog steering, the one or more signals in a respective direction to yield the steered analog signal pattern.

15. The system of claim 13, wherein the one or more processing elements are further configured to perform operations comprising:
generating the one or more steered digital signal patterns by:
based on the respective steered analog signal pattern associated with at least one of the plurality of channels, steering one or more nulls in one or more directions associated with at least one of a source of interference and an unwanted target, the one or more directions being at least partly within the steered analog signal pattern; and
steering a plurality of digital signals associated with a set of channels from the plurality of channels, the plurality of digital signals being steered in one or more different directions associated with one or more targets.

16. The system of claim 13, wherein generating the one or more steered digital signal patterns comprises:
based on the respective steered analog signal pattern associated with at least one of the plurality of channels, steering one or more nulls in one or more directions associated with at least one of a source of interference and an unwanted target, the one or more directions being at least partly confined within the steered analog signal pattern; and
steering a plurality of digital signals associated with a set of channels from the plurality of channels, the plurality of digital signals being steered in one or more different directions associated with one or more targets.

17. The system of claim 16, wherein steering at least one of the plurality of digital signals and the one or more nulls is based on data collected via at least one of the plurality of channels, and wherein at least a portion of the data is collected from at least one of the one or more signals received at each of the plurality of groups of antenna elements.

18. The system of claim 13, wherein each respective channel comprises a group of antenna elements, phase shifters and amplifier elements, wherein each antenna element from the group of antenna elements is associated with a phase shifter and at least one amplifier element, wherein the at least one amplifier element comprises a low-noise amplifier and a variable-gain amplifier.

* * * * *